US012632537B2

(12) United States Patent
Ponsini et al.

(10) Patent No.: US 12,632,537 B2
(45) Date of Patent: May 19, 2026

---

(54) EXECUTING CRYPTOGRAPHIC OPERATIONS IN A SECURE ELEMENT PLATFORM RUNTIME ENVIRONMENT

(71) Applicant: Oracle International Corporation, Redwood Shores, CA (US)

(72) Inventors: Nicolas Michel Raphaël Ponsini, Mougins (FR); Sebastian Jürgen Hans, Berlin (DE)

(73) Assignee: Oracle International Corporation, Redwood Shores, CA (US)

( * ) Notice: Subject to any disclaimer, the term of this patent is extended or adjusted under 35 U.S.C. 154(b) by 81 days.

(21) Appl. No.: 18/535,432

(22) Filed: Dec. 11, 2023

(65) Prior Publication Data

US 2025/0148071 A1 May 8, 2025

Related U.S. Application Data

(60) Provisional application No. 63/595,907, filed on Nov. 3, 2023.

(51) Int. Cl.
*G06F 21/53* (2013.01)
*H04L 9/06* (2006.01)
(Continued)

(52) U.S. Cl.
CPC ............ *G06F 21/53* (2013.01); *H04L 9/0618* (2013.01); *H04L 9/0825* (2013.01); *H04L 9/3247* (2013.01)

(58) Field of Classification Search
CPC ..... G06F 21/53; H04L 9/0618; H04L 9/0825; H04L 9/3247
See application file for complete search history.

(56) References Cited

U.S. PATENT DOCUMENTS

2010/0262829 A1* 10/2010 Brown .................... H04L 63/18
                                                          713/171
2015/0288514 A1* 10/2015 Pahl ...................... H04L 63/166
                                                          713/171
(Continued)

FOREIGN PATENT DOCUMENTS

EP        3758290 A1    12/2020
EP        4040716 A1 *  8/2022    ........... H04L 9/3247
(Continued)

OTHER PUBLICATIONS

"Comments Requested on Three Draft FIPS for Post-Quantum Cryptography," CSRC, Aug. 24, 2023, pp. 3., Feb. 14, 2024.
(Continued)

*Primary Examiner* — Darshan I Dhruv
(74) *Attorney, Agent, or Firm* — Invoke

(57) ABSTRACT

A system performs a set of cryptographic operations at least by utilizing an API to cause execution of a set of one or more secure element (SE) applications within the SE platform runtime environment of a first computing entity. The set of cryptographic operations include generating a first shared secret, generating a ciphertext at least by encapsulating the first shared secret with a first public key associated with a second computing entity in accordance with an encapsulation algorithm, and transmitting the ciphertext from the first computing entity to the second computing entity. The second computing entity derives the first shared secret by decapsulating the ciphertext with a private key corresponding to the first public key. The first computing entity and the second computing entity then exchange at least one encrypted message, encrypted with an encryption key that includes, or is based at least in part on, the first shared secret.

22 Claims, 20 Drawing Sheets

(51) Int. Cl.
|  |  |
|---|---|
| *H04L 9/08* | (2006.01) |
| *H04L 9/32* | (2006.01) |

(56) References Cited

U.S. PATENT DOCUMENTS

| 2016/0286391 | A1* | 9/2016 | Khan | G06Q 20/327 |
|---|---|---|---|---|
| 2018/0082065 | A1* | 3/2018 | Liu | H04L 9/3247 |
| 2019/0164156 | A1* | 5/2019 | Lindemann | H04L 63/0861 |
| 2019/0319802 | A1 | 10/2019 | Misoczki et al. | |
| 2020/0235929 | A1* | 7/2020 | Jacobs | H04L 9/3073 |
| 2021/0226782 | A1* | 7/2021 | Florit | H04L 9/0844 |
| 2022/0231843 | A1* | 7/2022 | Garcia Morchon | H04L 9/0844 |
| 2022/0278833 | A1* | 9/2022 | Nix | H04L 9/0618 |
| 2022/0345298 | A1* | 10/2022 | Cap | H04L 9/14 |
| 2023/0336334 | A1* | 10/2023 | Scheible | H04L 9/0825 |
| 2023/0353349 | A1* | 11/2023 | Cap | H04L 9/0897 |
| 2024/0275599 | A1* | 8/2024 | Albert | G06Q 20/382 |

FOREIGN PATENT DOCUMENTS

| WO | 2019/071026 | A1 | 4/2019 | | |
|---|---|---|---|---|---|
| WO | 2021/062517 | A1 | 4/2021 | | |
| WO | WO-2024175953 | A1 * | 8/2024 | | H04L 9/0844 |

OTHER PUBLICATIONS

"Cyber; Quantum-safe Hybrid Key Exchanges," TS 103 744 V1.1.1, Dec. 2020, pp. 42.

Barnes. R. et al., "RFC 9180_ Hybrid Public Key Encryption," Feb. 2022, pp. 85.

Ounsworth. M. et al., "Combiner function for hybrid key encapsulation mechanisms (Hybrid KEMs)," Jan. 9, 2024, pp. 13.

Wood C., "HPKE: Standardizing public-key encryption (finally!)," Feb. 24, 2022, pp. 15.

"Java Card Platform Specification Release Notes", Version 3.2, Jan. 2023, pp. 1-18.

"Java Card™ Platform, Application Programming Interface, Classic Edition Version 3.2", Retrieved from https://docs.oracle.com/en/java/javacard/3.2/jcapi/api_classic/index.html, Retrieved on Jul. 25, 2024, pp. 1-5.

"Runtime Environment Specification, Classic Edition", Version 3.2, Java Card™ Platform, Jan. 2023, pp. 1-136.

"Virtual Machine Specification, Classic Edition", Version 3.2, Java Card™ Platform, Jan. 2023, pp. 1-274.

Cooper et al., "Recommendation for Stateful Hash-Based Signature Schemes", NIST SP 800-208, Oct. 2020, pp. 59.

Fluhrer et al., "Additional Parameter sets for HSS/LMS Hash-Based Signatures", Sep. 18, 2023, pp. 20.

Huelsing et al., "XMSS: eXtended Merkle Signature Scheme", Retrieved from https://datatracker.ietf.org/doc/html/rfc8391, May 2018, pp. 1-74.

Mcgrew et al., "Leighton-Micah Hash-Based Signatures", Apr. 2019, pp. 1-61.

National Institute of Standards and Technology, "Stateless Hash-Based Digital Signature Standard", FIPS 205 (Draft), Aug. 24, 2023, pp. 58.

"Document Search", Retrieved from https://datatracker.ietf.org/doc/search?name=draft-ietf-lamps-pq-composit&rfcs=on&activedrafts=on&olddrafts=on, Retrieved on Mar. 4, 2025, p. 1.

"Falcon: Fast-Fourier Lattice-based Compact Signatures over NTRU", Specification v1.2, Jan. 10, 2020, pp. 1-67.

"Information technology—Open Systems Interconnection—The Directory: Public-key and attribute certificate frameworks", Recommendation ITU-T X.509, Oct. 2019, pp. 236.

"ITU-T Recommendations", Retrieved from https://handle.itu.int/11.1002/1000/14033, Oct. 14, 2019, pp. 1-2.

"Module-Lattice-Based Digital Signature Standard", Federal Information Processing Standards Publication, Aug. 13, 2024, pp. 65.

Ounsworth et al., "Composite ML-DSA for use in Internet PKI", Mar. 4, 2024, 34 Pages.

Ounsworth et al., "Composite ML-DSA for use in X.509 Public Key Infrastructure and CMS", Mar. 3, 2025, pp. 65.

Ando, M., et al., "Hash-based TPM signatures for the quantum world.", International Conference on Applied Cryptography and Network Security, Jun. 9, 2016, pp. 77-94.

Banerjee T et al., "Post-Quantum Cryptography for Engineers", draft-ietfpquip-pqc-engineers-00; draft-ietf-pquip-pqc-engineers-00.txt, Internet-draft: Pquip, Internet Engineering Task Force, Ietf, Standardworkingdraft, Retrieved from URL: https://tools.ietf.org/html/draft-ietf-pquip-pqc-engineers-00, Aug. 30, 2023, 33 Pages.

Chalkias, K., et al., "Blockchained post-quantum signatures.", International Conference on Internet of Things, Jul. 30, 2018, pp. 1196-1203.

Iftikhar, Z., et al., "Quantum safe cloud computing using hash-based digital signatures.", International Conference on Automation and Computing, Sep. 2, 2021, pp. 1-6.

Ulitzsch V.Q., et al., "A Post-Quantum Secure Subscription Concealed Identifier for 6G", Proceedings of the Twelveth Acm Conference on Data and Application Security and Privacy, Acmpub27, May 16-19, 2022, pp. 157-168 (13 Pages).

* cited by examiner

| Computing Entity A<br>302 | | Computing Entity B<br>304 |
|---|---|---|

Generate a public-private key pair A

306

Generate a public-private key pair B

310

Send public key A

308

Send public key B

312

Combine private key A with public
key B to generate KA shared secret

316

Combine private key B with public
key A to generate KA shared secret

320

Engage in secure communications
using the KA shared secret

322

Computing Entity A
302

Computing Entity B
304

Generate a public-private key pair C

330

Send public key C

332

Generate a KEM shared secret

334

Encapsulate the KEM shared secret w/ public key C to generate a ciphertext

336

Send ciphertext

338

Decapsulate the ciphertext w/ private key C to obtain the KEM shared secret

340

Engage in secure communications using the shared secret

342

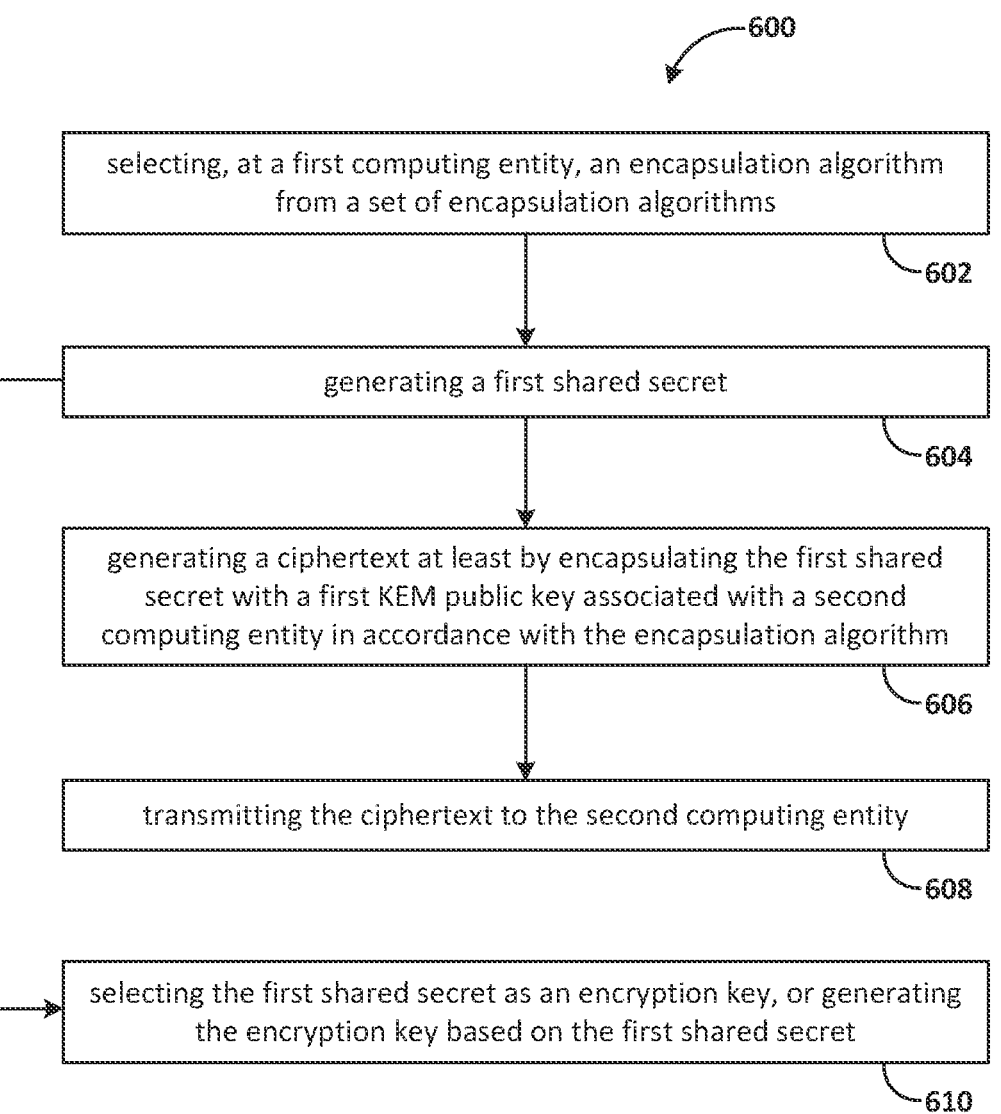

600 selecting, at a first computing entity, an encapsulation algorithm from a set of encapsulation algorithms

602 generating a first shared secret

604 generating a ciphertext at least by encapsulating the first shared secret with a first KEM public key associated with a second computing entity in accordance with the encapsulation algorithm

606 transmitting the ciphertext to the second computing entity

608 selecting the first shared secret as an encryption key, or generating the encryption key based on the first shared secret

EXECUTING CRYPTOGRAPHIC OPERATIONS IN A SECURE ELEMENT PLATFORM RUNTIME ENVIRONMENT

INCORPORATION BY REFERENCE; DISCLAIMER

The following application is hereby incorporated by reference: application No. 63/595,907 filed on Nov. 3, 2023. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to executing cryptographic operations in a secure element platform runtime environment. More particularly, the present disclosure relates to executing quantum-resistant cryptographic operations in a secure element platform runtime environment.

BACKGROUND

Encryption keys for encrypting messages that are transmitted between computing entities may be generated using various cryptographic operations. These cryptographic operations may include key agreement (KA) algorithms and/or Key Encapsulation Mechanism (KEM) algorithms. KA algorithms enable computing entities to establish a shared secret key securely, ensuring that only they can derive the same key. Typically, both computing entities generate private keys that are used only for this specific KA session. These private keys are combined with corresponding public keys through a KA algorithm such as a Diffie-Hellman algorithm. This results in a shared secret, which can be used as an encryption key for encrypting and decrypting messages. For KEM algorithms, a computing entity encapsulates a shared secret with a recipient-computing entity's public key using a KEM algorithm. The output is an encapsulated message that includes the encapsulated shared secret. The recipient-computing entity, which holds the corresponding private key, can then decapsulate the encapsulated message to retrieve the shared secret. A KA algorithm and a KEM algorithm can be combined to provide a hybrid cryptographic algorithm to generate a combined shared secret that can similarly be used as an encryption key.

Once a shared secret is established, for example, through a KA algorithm, a KEM algorithm, or a combined cryptographic algorithm, the shared secret may be utilized in a symmetric encryption algorithm as an encryption key for message encryption and decryption. Both computing entities can independently compute the same shared secret key, ensuring they have a secure means of communication. A symmetric encryption algorithm, such as AES (Advanced Encryption Standard), may be used. The symmetric encryption algorithm utilizes the encryption key to transform a plaintext message into ciphertext, and vice versa. The ciphertext can only be decrypted using the same encryption key, ensuring the confidentiality and integrity of the messages.

The content of this background section should not be construed as prior art merely by virtue of its presence in this section.

BRIEF DESCRIPTION OF THE DRAWINGS

The embodiments are shown by way of example and not by way of limitation in the figures of the accompanying drawings. It should be noted that references to "an" or "one" embodiment in this disclosure are not necessarily to the same embodiment, and they mean at least one. In the drawings:

FIGS. 6A and 6B are flowcharts that illustrate example operations pertaining to generating encryption keys in accordance with one or more embodiments.

DETAILED DESCRIPTION

Figure 1:
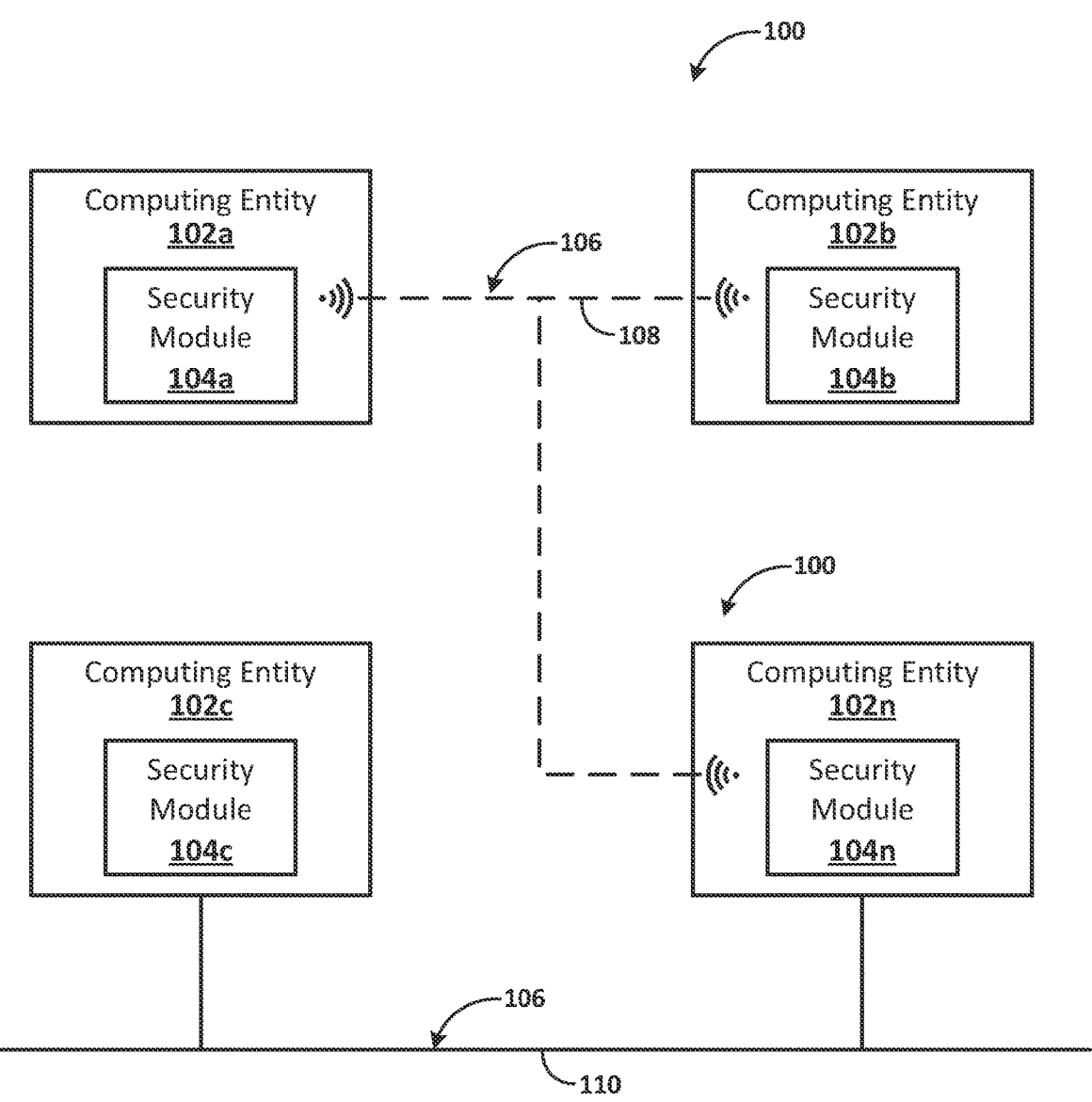
FIG. 1 illustrates an example message exchange system in accordance with one or more embodiments.

In the following description, for the purposes of explanation, numerous specific details are set forth in order to provide a thorough understanding. Detailed examples are described below for purposes of clarity. One or more embodiments may be practiced without these specific details. Components and/or operations described below should be understood as one specific example which may not be applicable to certain embodiments. Features described in one embodiment may be combined with features described in a different embodiment. In some examples, well-known structures and devices are described with reference to a block diagram form in order to avoid unnecessarily obscuring the present invention. Components and/or operations described below should not be construed as limiting the scope of any of the claims.

1. GENERAL OVERVIEW
2. EXAMPLE MESSAGE EXCHANGE SYSTEM
3. EXAMPLE COMPUTING ENTITY ARCHITECTURE
4. EXAMPLE CRYPTOGRAPHIC OPERATIONS
5. EXAMPLE MESSAGE ENCRYPTION OPERATIONS
6. EXAMPLE OPERATIONS FOR GENERATING ENCRYPTION KEYS
7. COMPUTER NETWORKS AND CLOUD NETWORKS
8. MICROSERVICE APPLICATIONS
9. HARDWARE OVERVIEW
10. MISCELLANEOUS; EXTENSIONS

1. General Overview

One or more embodiments utilize a secure element (SE) hardware processor to execute encapsulation algorithms to generate shared secrets within a SE platform runtime environment. The shared secrets are utilized to encrypt messages that are transmitted between computing entities. In one example, a cryptography module is initiated within the SE platform runtime environment, and a set of one or more SE applications, or applets, are selected and executed to perform a set of cryptographic operations within the SE platform runtime environment.

In one example, the set of cryptographic operations may include operations associated with a key KEM algorithm. In addition to the KEM operations, the set of cryptographic operations may include operations associated with a KA algorithm. In one example, a KEM shared secret and a KA shared secret may be combined with a combination parameter in accordance with a combination function to generate a combined shared secret. The combined shared secret may be utilized to encrypt messages transmitted between the computing entities. The encapsulation algorithms utilized in the cryptographic operations may include legacy cryptographic algorithms, quantum-resistant cryptographic algorithms, or a combination of these. The combination of a legacy cryptographic algorithm with a quantum-resistant cryptographic algorithm may be utilized to generate combined shared secrets that benefit from both time-honored robustness of legacy cryptographic algorithm as well as enhanced post-quantum security of quantum-resistant cryptographic algorithms.

In one example, the particular algorithms utilized in the cryptographic operations may be selected via one or more cryptography modules. The one or more cryptography modules may be provided by an application programming interface (API). An SE application object may be initiated in the SE platform runtime environment, and the SE application object may access and execute one or more of the cryptography modules. Additionally, or in the alternative, the SE application object may cause one or more of the cryptography modules to be executed within a logical secure element (LSE) of the SE platform runtime environment. Further, one or more cryptography modules may be incorporated into one or more SE applications, or applets, located within a particular LSE, and the one or more cryptography modules may be respectively executed by the respective SE application within the particular LSE to perform the corresponding cryptographic operations.

In one example, various SE applications are executed in a particular LSE of the SE platform runtime environment. A particular LSE may be utilized to execute one or more objects of an SE application. In this way, the cryptographic operations are securely contained within the particular LSE. Additionally, or in the alternative, separate LSEs may be utilized to execute separate SE applications, thereby isolating the particular cryptographic operations to their respective LSEs. Advantageously, the algorithms and parameters associated with the cryptographic operations remain securely within the SE platform runtime environment. Further, in the event that an SE application or its algorithms or its parameters has a vulnerability or becomes compromised, the execution of the various SE applications within separate LSEs provides assurance that a resulting security exposure would be confined to the particular LSE where the vulnerability or comprise is located. Hence, other SE applications and their algorithms and parameters may remain securely contained within their respective LSEs.

This General Overview section is intended to provide a general overview without addressing all aspects of the present disclosure. The full scope of the presently disclosed subject matter is understood from the content of the present disclosure in its entirety.

2. Example Message Exchange Systems

Referring now to FIG. 1, example message exchange systems 100 are described. A message exchange system 100 may include a plurality of computing entities 102, such as computing entity 102a, computing entity 102b, computing entity 102c, and computing entity 102n. One or more of the computing entities 102a-n may include a security module 104. A security module that may be utilized to exchange encrypted messages between computing entities 102. A security module 104 may include a SE hardware component. The SE hardware component may be configured as described with reference to FIGS. 2A-2C.

The plurality of computing entities 102 may be configured to exchange encrypted messages via a wired or wireless connection. In one example, the plurality of computing entities 102 may be configured to connect to one or more data communication networks 106. The one or more data communication networks 106 may include a wireless network 108 and/or a wired network 110.

Example data communication networks include Global Systems for Mobile (GSM), Code Division Multiple Access (CDMA), Universal Mobile Telecommunication System (UMTS), Long Term Evolution (LTE), General Packet Radio Service (GPRS), Universal Mobile Telecommunications System (UMTS), Broadband Global Area Network (BGAN), wireless local area network (WLAN), Personal Area Networks (PAN), Local Area Networks (LAN), Metropolitan Area Networks (MAN), Wide Area Networks (WAN), Internet-of-Things (IoT) networks, Satellite Networks, cloud computing networks, or Ethernet networks. Example PAN networks may include Ultra-wideband networks, Bluetooth networks, Zigbee networks, Near-field communication networks. Example LAN networks may include Wi-Fi networks or WLAN networks. Example MAN networks may include Worldwide Interoperability for Microwave Access (WiMAX networks). Example WAN networks may include cellular networks (e.g., 2G, 3G, 4G, or 5G mobile networks). Example IoT networks may include Ultra-wideband networks, Matter networks, Zigbee networks, LoRa networks, or Sigfox networks.

The computing entities 102 may be different devices, or different components of a particular device. The computing entities 102 may respectively include one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a smart card, a personal digital assistant (PDA), a wireless receiver and/or transmitter, a base station, a communication management device, a router, a switch, a controller, an access point, and/or a browser device. In one example, the system 100 may include one or more computing entities 102 that are smart cards, and one or more computing entities 102 that are smart card readers. For example, computing entity 102a and/or computing entity 102b may respectively be a smart card, and computing entity 102n may be a smart card reader.

In one example, the system 100 may include a host device and a client device. The host device and/or the client device may include a computing entity 102 configured as described with reference to FIG. 1. The client device may include a computing entity 102 configured as a smart card, such as an EMV card, or a universal integrated circuit card (UICC). A UICC is a smart card that conforms to the specifications defined by the European Telecommunications Standards Institute ETSI Smart Card Platform project. A subscriber identification module (SIM) card is an example of a UICC. The host device may include a computing device, such as a computing entity 102, that communicates with the client device. The host device may be a payment device and the client device may be a payment device, such as a payment card.

In one example, the client device may communicate with the host device via a contactless communication protocol, such as a Near-field communication protocol. Additionally, or in the alternative, the host device may include a slot configured to receive the client device. For example, a client device configured as a payment card may be inserted into a slot of a host device to communicatively couple the client device to the host device. As another example, the client device may be configured as a SIM card that is insertable into a slot of a host device. In yet another example, the client device may be configured as an embedded SE or an eSIM card that is wired to the host device. In yet another example, the client device may be integrated into the host device. As further examples, the client device may be configured as at least one of: a payment card, an access control card, an identity card, an electronic passport, a security identification card, a health insurance card, a transportation card, a secure USB token, an internet-of-things device, a mobile telecommunications device.

3. Example Computing Entity Architecture

Figure 2A:
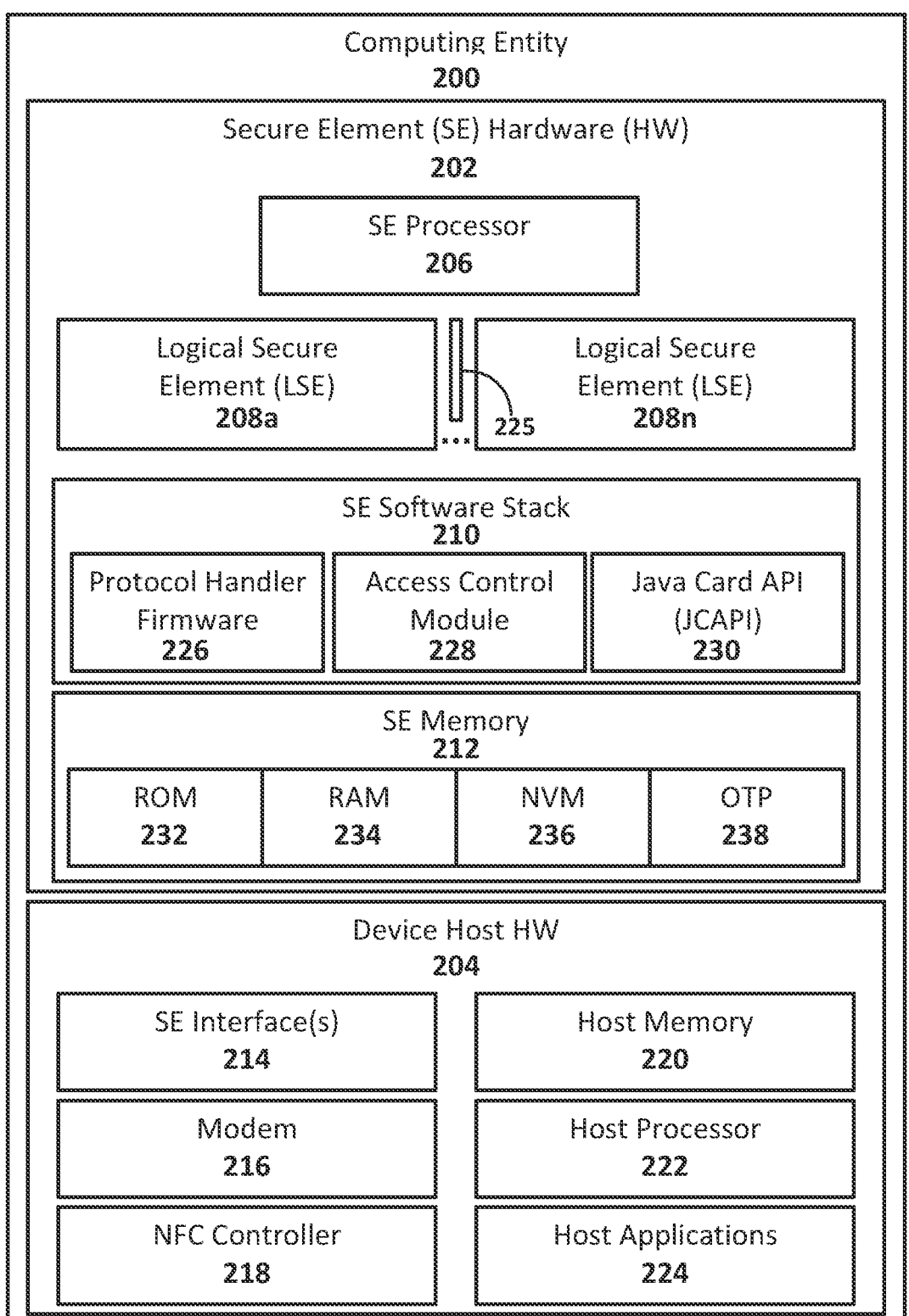
FIGS. 2A-2C illustrate example architecture of a computing entity in accordance with one or more embodiments.
Figure 2B:
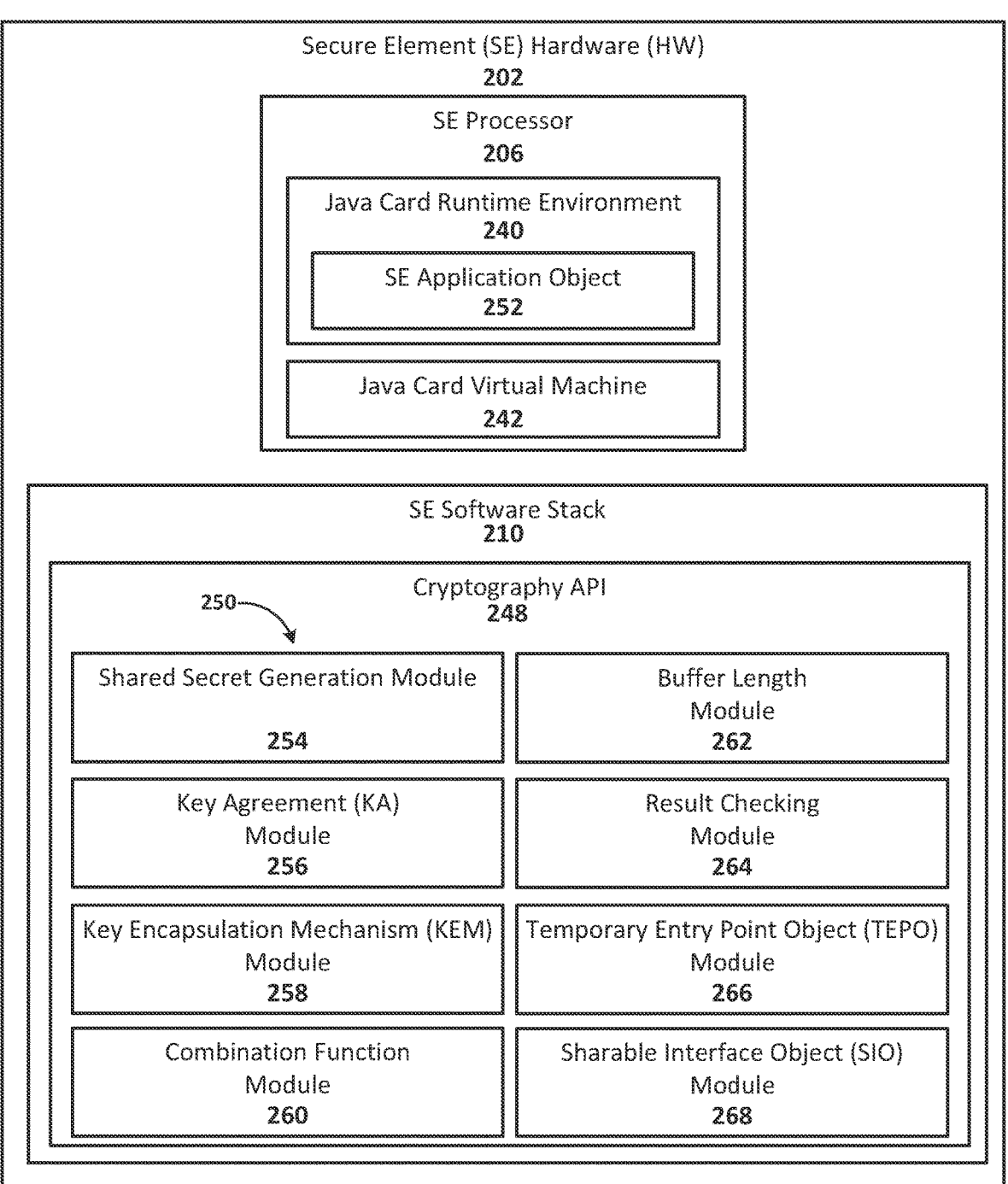
Figure 2C:
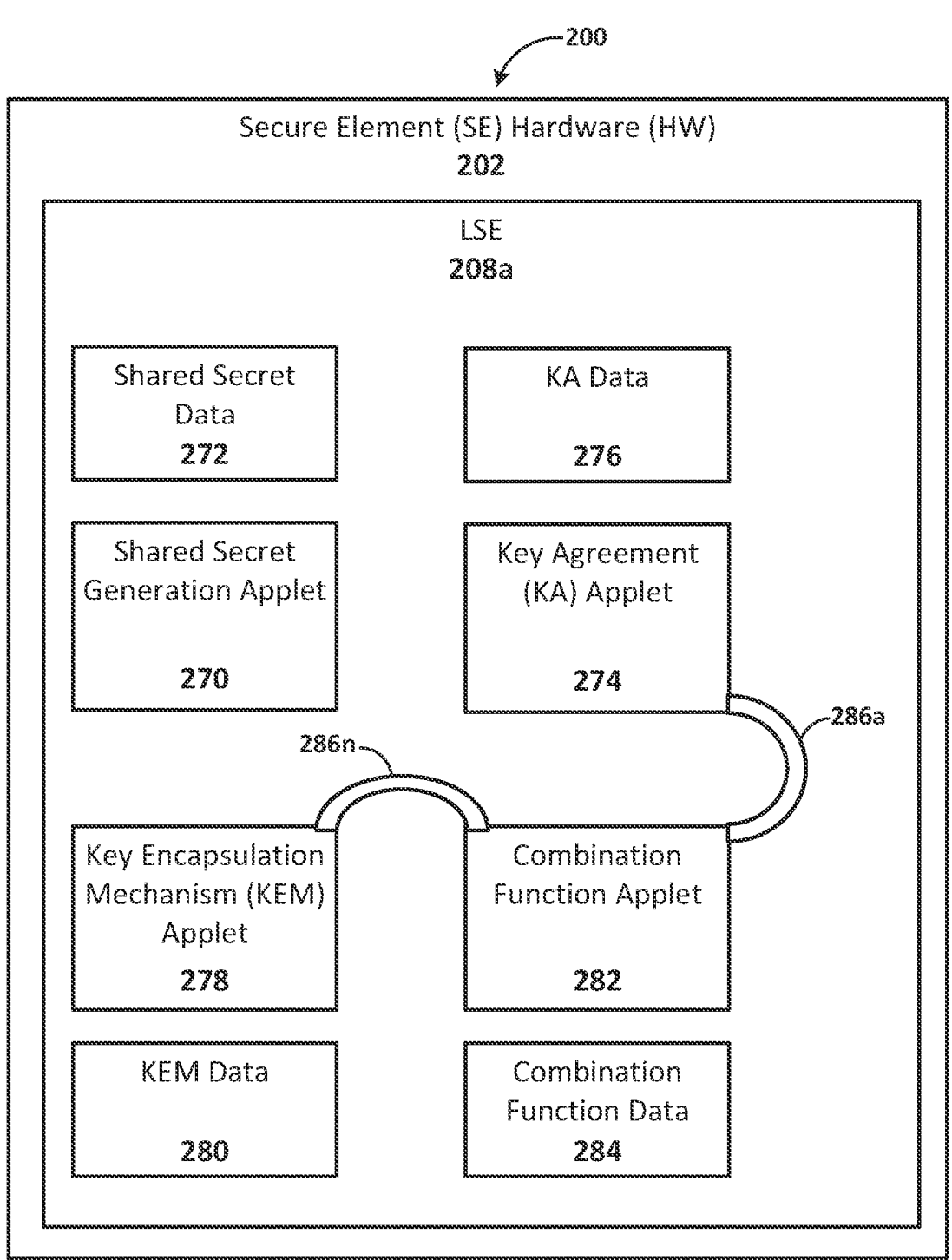

Referring now to FIGS. 2A-2C, architecture of an example computing entity 200 is described. In one example, the system 100 described with reference to FIGS. 1A and 1B may include one or more computing entities configured as described with reference to FIGS. 2A-2C. A computing entity may include more or fewer components than the components illustrated in FIG. 2A-2C, depending on the particular architecture.

As shown in FIG. 2A, the system architecture of a computing entity 200 includes SE hardware 202 and device host hardware 204. SE hardware 202 may include SE processor 206, and a plurality of LSEs 208, such as LSE 208a and LSE 208n. The SE hardware 202 may further include an SE software stack 210, and an SE memory 212. The device host hardware 204 may include SE interface 214, modem 216, near-field communication (NFC) controller 218, host memory 220, and host processor 222. Device host hardware 204 may run host applications 224.

In some embodiments, SE hardware 202 may include a microprocessor-based chip that may include hardware components for protecting secure data from unauthorized access and running secure applications. SE hardware 202 may include a smart card, such as a UICC (e.g., a SIM card). Additionally, or alternatively, SE hardware 202 may include other types of integrated circuit cards (ICCs) and tamper-resistant security chips for controlling access to secure resources.

In some embodiments, the SE hardware 202 may represent at least a portion of a SE platform. For example, an SE platform may include the SE hardware 202 and at least one additional hardware component. An example SE platform is a Java Card platform. An SE platform, such as a Java Card platform, refers to an ecosystem or framework that enables the development, personalization, and/or execution of SE applications. An SE platform may include the SE hardware 202, the SE software stack 210, and other components utilized for deploying SE applications.

In some embodiments, SE processor 206 is a microprocessor for executing an SE platform runtime environment and SE applications. An example SE platform runtime environment is Java Card Runtime Environment (JCRE). The JCRE provides a lightweight version of the Java Runtime Environment (JRE) that is tailored for smart cards and other tamper-resistant security chips to allow these SE hardware platforms to host SE applications, for example, employing Java technology. The SE processor and/or the JCRE may represent a portion of the SE platform. The JCRE may execute SE applications, for example, on the SE processor 206 and/or on one or more LSEs 208. The JCRE may provide an execution environment for the SE applications. The JCRE may execute operations associated with SE applications, including, for example, loading and unloading SE applications, scheduling SE application execution, isolation and security of SE applications, SE application memory management, and/or interactions between SE application and underlying hardware.

The SE platform runtime environment may be executed on at least one SE processor 206. The SE platform runtime environment may include instructions, which when executed by the at least one SE processor 206, cause performance of a set of cryptographic operations. The cryptographic operations may include operations associated with generating shared secrets and/or encryption keys for use in encrypted communications between the computing entity 200 and another computing entity. The cryptographic operations may be performed by executing a set of one or more SE applications within the SE platform runtime environment.

A hosted SE application within the JCRE may be referred to as an applet, or as a Java Card applet. The JCRE may include a firewall mechanism 225 that isolates different applets on the smart card and a sharing mechanism that allows applets to explicitly make objects available to other applets. The JCRE may further include a Java Card Virtual Machine (JCVM) that runs bytecode, which is generated using a different encoding schema than the full JRE. Generally, the encoding schema of the JCRE reduces the memory footprint of an application to optimize for the application for execution by SE hardware 202, which generally includes more constraints than host hardware 204. For example, the size of SE memory 212 may be much smaller than host memory 220 and the speed of SE processor 206 may be much slower than host processor 222. Further, the native instruction set architecture (ISA) of SE processor 206 may be smaller or otherwise different than the ISA of host processor 222. One optimization technique to account for the constraints is to divide an application's code into packages below a size threshold and to restrict the packages that programming language constructs that are available within the environment. Although some examples described herein relate to the JCRE, embodiments described herein may be implemented by other runtime environments that execute on smart cards and other tamper-resistant chips.

SE hardware 202 runs multiple LSEs 208a-n, which may operate as if multiple secure element chips have been installed within computing entity 200 from the perspective of a mobile device user. For example, LSEs 208a-n may operate as if multiple embedded and/or removable SIM cards were currently operating within computing entity 200. Thus, LSEs 208a-n may correspond to virtual SIM cards and/or other tamper-resistant chips that share and are run from the same SE hardware components. SE hardware 202 and/or firmware running therein may enforce isolation between different LSEs to prevent one LSE from accessing the applets and code of another LSE. The isolation mechanism may be separate and distinct from the firewall mechanism 225 of the JCRE previously mentioned. The firewall mechanism 225 may be applied to a given LSE to maintain separation between different applets that are installed on the same LSE. The isolation mechanism may be implemented at a lower level to maintain isolation between different LSEs, each of which may be configured with their own firewalls 225.

SE software stack (SESS) 210 may include a set of components used to execute SE applications. SESS 210 may include code, referred to herein as SESS-code, that executes applets and provides a runtime environment for the applets. In some embodiments, SESS 210 may include protocol handler firmware 226, an access control module 228, and a Java Card API (JCAPI) 230. Additionally, or alternatively, SESS 210 may include other components, such as a JCVM, other APIs, and/or other components of the JCRE for hosting Java Card applications. The JCAPI may include a set of software libraries, classes, and/or methods provided by the SE platform. SE applications may use the JCAPI to interact with underlying components of the SE hardware 202 to execute various functionalities. In some embodiments, the SESS-code is distinct from the code of applets and LSE applications. SESS-code provides a program and runtime environment for executing the LSE application code. For instance, the SESS-code may provide a virtual machine that runs LSE applets. Additionally, or alternatively, the SESS-code may manage access to the SE hardware components, such as crypto accelerators and memory segments, and/or perform memory management operations including allocating runtime memory for an applet that is currently running within the runtime environment. The SESS-code may be common to LSEs 208*a-n* to optimize for size and reduce processing overhead.

In some embodiments, protocol handler firmware 226 is low-level firmware that is used by SESS-code to manage operations targeting LSEs 208*a-n*. In the case of a Java Card based secure element, protocol handler firmware 226 may be part of the JCRE. However, the firmware may be integrated into other runtime environments or in a standalone manner, depending on the particular implementation.

In some embodiments, protocol handler firmware 226 manages routing messages received from device host hardware 204 to the targeted LSE. When routing messages, protocol handler firmware 226 may trigger a switch operation to change which LSE is currently active and running on SE hardware 202.

Access control module 228 provides authentication to prevent unauthorized entities from triggering changes between LSEs and/or other operations that access LSE data. Access control module 228 may be a component of protocol handler firmware 226 or may be a separate component, depending on the particular implementation. Access control module 228 may block requested operations if the message is not successfully verified as having originated from an entity authorized to trigger the requested operation.

SE memory 212 may include one or more types of volatile and/or non-volatile storage such as read-only memory (ROM) 232, random-access memory (RAM) 234, non-volatile memory (NVM) 236, and one-time programmable (OTP) memory 238. SE memory 212 may store the data in an encrypted format. As described further below, the encryption scheme, such as the encryption algorithm and/or key location, may vary between different LSEs to provide data integrity and isolation. In some embodiments, SE memory 212 securely stores data for LSEs 208*a-n*.

In some embodiments, switch commands and other messages originate from device host hardware 204. For example, messages may be received wirelessly through modem 216 and/or NFC controller 218. The messages may be routed to SE hardware 202 by SE interface 214. SE interface 214 may convert the messages received wirelessly to a format that is consumable by protocol handler firmware 226. Additionally, or alternatively, SE interface may include a bus or other communication system for transferring messages from device host hardware 204 to SE hardware 202.

In some embodiments, modem 216 is a mobile broadband modem that sends and receives messages via a mobile broadband connection. For example, carriers, including mobile network operators (MNOs) and mobile virtual network operators (MVNOs), may send network messages to a mobile phone wirelessly through modem 216 via a cellular network. Different LSEs may be targeted based on which mobile phone operator sent the message. SE hardware 202 may support multiple virtual SIM cards from different mobile phone operators. Additionally, or alternatively, other messages received wirelessly through modem 216 may target different types of LSEs. Example LSE applications may include payment processing, biometric authentication, identity management, and mobile network communications.

In some embodiments, NFC controller 218 receives near-field wireless messages from external devices. NFC communications may transmit data through inductive coupling between an antenna in NFC controller 218 and the external device when placed within a threshold distance. An NFC message may trigger an operation in an LSE. For example, a payment terminal may generate an NFC message to extract credit card information and/or other data during a transaction. The target LSE may securely store financial information of a mobile device user and include one or more applets for processing secure transactions initiated with a payment terminal. NFC messages may trigger other operations, which may vary depending on the type of LSE application and SSP associated with the application.

Additionally, or alternatively, device host hardware 204 may include other components for receiving messages through wired or wireless interfaces. For example, device host hardware 204 may include a Bluetooth module, a Zigbee chip, a Wi-Fi card, an infrared receiver, a universal serial bus (USB) controller, and/or a serial communications interface. Messages received through such hardware components may serve as external triggers that initiate operations to switch between LSEs 208*a-n* and access resources that have been mapped to the LSE.

Device host hardware 204 may further include host memory 220 and host processor 222 for executing host applications 224. For example, a smartphone may include a mobile processor and RAM for executing a mobile operating system and mobile phone applications. Processor 222 and host memory 220 may be physically separate from SE hardware 202 to protect against attacks if the security of computing entity 200 is compromised. SE hardware 202 may prevent processor 222 from accessing secure data stored in SE memory 212. Requests to access the data may be routed through protocol handler firmware 226.

In other embodiments, device host hardware 204 may include additional or fewer components. For example, some devices, such as smart credit cards and company badges, may not include a mobile processor, CPU, or memory external to the secure element. These devices may not execute applications other than the applets hosted by SE hardware 202. Thus, the architecture of device host hardware 204 may vary depending on the particular type of device in which SE hardware 202 is integrated.

Referring now to FIG. 2B, example configurations of a SE hardware 202 are further described. As shown in FIG. 2B, the SE hardware may include an SE processor 206 that may execute a JCRE 240 and a JCVM 242. The JCRE 240 and/or the JCVM 242 may be implemented as firmware. The JCRE 240 and the JCVM 242 may work in tandem to provide a secure and controlled environment for executing SE applications. The JCRE 240 may interact with the underlying components of the SE hardware 202 to manage the execution of SE applications. The JCRE 240 may provide features to support execution of SE applications, including memory management, security mechanisms, loading and unloading of SE applications, and/or scheduling execution of SE applications. The JCVM 242 may execute bytecode instructions of the SE applications.

As further shown in FIG. 2B, the SE hardware 202 may include a SE software stack 210 that includes a cryptography API 248. The cryptography API 248 may include a set of cryptography modules 250 that one or more SE applications may use to execute cryptographic operations. Various parameters utilized by the cryptography modules 250 may be configured, for example, based on one or more user inputs and/or based on a selected mode of operation. One or more cryptography modules of the cryptography API 248 may be executed by an SE application within the JCRE 240 and/or within an LSEs 208 (FIGS. 2A and 2C). In one example, a set of cryptographic operations may be performed by executing one or more SE applications within the JCRE 240. As shown in FIG. 2B, the cryptography API 248 may initialize an SE application object 252 within the JCRE 240. The SE application object 252 may include an SE application configured to execute one or more cryptography modules 250 within the JCRE 240. The SE application object 252 may import one or more of the cryptography modules 250 from the cryptography API 248 to access and execute the one or more of the cryptography modules 250 in the JCRE 240. Additionally, or in the alternative, a set of cryptographic operations may be performed by executing one or more SE applications within a particular LSE 208. In one example, the SE application object 252 may instruct a particular SE application within a particular LSE 208 to import one or more cryptography modules 250 and to execute the one or more cryptography modules 250 within the particular LSE 208. The SE application object 252 may access and one or more cryptography modules of the cryptography API 248 may be executed by an SE application, such as within an LSEs 208, as described with reference to FIG. 2C.

As shown in FIG. 2B, in one example, the one or more cryptography modules 250 may include at least one of: shared secret generation module 254, a KA module 256, a KEM module 258, or a combination function module 260. The shared secret generation module 254 may generate shared secrets by executing one or more cryptographic algorithms. In one example, a shared secret generated by the shared secret generation module 254 may be utilized as an encryption key. Additionally, or in the alternative, the shared secret generation module 254 may generate an encryption key that includes, or is based on, a shared secret.

In one example, the cryptographic algorithms executed by the shared secret generation module 254 may include one or more KA algorithms and/or one or more KEM algorithms. Additionally, or in the alternative, the cryptographic algorithms may include one or more hybrid algorithms. A hybrid algorithm may include a combination of one or more KA algorithms and/or one or more KEM algorithms. The particular cryptographic algorithms may be selected from among a set of cryptographic algorithms, such as a set of KA algorithms and/or a set of KEM algorithms. One or more cryptographic algorithms may be incorporated into the shared secret generation module 254. Additionally, or in the alternative, one or more cryptographic algorithms may be incorporated into additional cryptography modules 250 that may be accessed and utilized by the SE application object 252. In one example, a plurality of cryptographic operations may be incorporated into the shared secret generation module 254 and may be executed by the SE application object 252. Additionally, or in the alternative, the SE application object 252 may cause a plurality of different cryptographic operations to be executed by various applets within respectively different LSEs 208.

In one example, the one or more cryptography modules 250 may include a KA module 256. The KA module 256 may generate KA shared secrets by executing one or more KA algorithms. The one or more KA algorithms may be incorporated into the KA module 256. Additionally, or in the alternative, the one or more KA algorithms may be incorporated into additional cryptography modules 250 that may be accessed and utilized by the SE application object 252, for example, in connection with the KA module 256. In one example, the one or more KA algorithms may be selected by the KA module 256 from a set of KA algorithms.

In addition, or in the alternative to a KA module 256, in one example, the one or more cryptography modules 250 may include a KEM module 258. The KEM module 258 may generate KEM shared secrets by executing one or more KEM algorithms. The one or more KEM algorithms may be incorporated into the KEM module 258. Additionally, or in the alternative, the one or more KEM algorithms may be incorporated into additional cryptography modules 250 that may be accessed and utilized by the SE application object 252, for example, in connection with the KEM module 258. In one example, the one or more KEM algorithms may be selected by the KEM module 258 from a set of KEM algorithms.

In one example, a plurality of shared secrets may be combined to generate a combined shared secret. In one example, a KA shared secret and a KEM shared secret may be combined to generate a combined shared secret. The one or more cryptography modules 250 may include a combination function module 260. The combination function module 260 may execute one or more combination algorithms to generate a combined shared secret from a plurality of shared secrets. In one example, the combination function module 260 may generate combined KA-KEM shared secrets by executing one or more combination algorithms. The combination function module 260 may specify the order for combining the shared secrets. The one or more combination algorithms may be incorporated into the combination function module 260. Additionally, or in the alternative, the one or more combination algorithms may be incorporated into additional cryptography modules 250 that may be accessed and utilized by the SE application object 252, for example, in connection with the combination function module 260. In one example, the one or more combination algorithms may be selected by the combination function module 260 from a set of combination algorithms. In one example, a combined shared secret generated by combination function module 260 may be utilized as an encryption key. Additionally, or in the alternative, the combination function module 260 may generate an encryption key that includes, or is based on, a combined shared secret.

In one example, the combination function module 260 may utilize a KA shared secret and/or a KEM shared secret as inputs for a combination algorithm. The KA module 256 may generate a KA shared secret, and the combination function module 260 may utilize the KA shared secret as an input for a combination algorithm. Additionally, or in the alternative, the KEM module 258 may generate a KEM shared secret, and the combination function module 260 may utilize the KEM shared secret as an input for the combination algorithm.

In one example, the combination function module 260 may include one or more KA algorithms and/or one or more KEM algorithms. For example, the combination function module 260 may reflect a combination of the KA module 256, the KEM module 258, and a combination algorithm. In one example, the KA shared secret, the KEM shared secret, and the combined shared secret may be generated by the SE application object 252 within the JCRE 240. The combined shared secret may be provided as an output from SE application object 252. The KA shared secret and the KEM shared secret utilized to generate the combined shared secret may remain within the JCRE 240. The KA shared secret and the KEM shared secret may be discarded after generation of the combined shared secret.

In one example, the cryptography API 248 may include a buffer length module 262. The buffer length module 262 may determine a length of a shared secret and/or a length of an encoded message associated with a particular cryptographic algorithm. The buffer length module 262 may define a buffer length for a particular cryptographic operation based on the length of the shared secret and/or the length of the encoded message. The buffer length module 262 may dynamically size the buffer length to accommodate the particular cryptographic operation. Additionally, or in the alternative, buffer length module 262 may determine the buffer length to avoid buffer overflows. Additionally, or in the alternative, buffer length module 262 may determine a security vulnerability and/or a data processing error based on a proportion of the buffer that is utilized by a particular cryptographic operation. For example, the buffer length module 262 may determine an occurrence of a security vulnerability and/or a data processing error when the proportion of the buffer utilized by the particular cryptographic operation meets an upper threshold buffer length and/or when the proportion of the buffer utilized by the particular cryptographic operation is below a lower threshold buffer length.

In one example, the cryptography API 248 may include a result checking module 264. The result checking module 264 may execute one or more result checking operations upon a result of a particular cryptographic operation. In one example, a result checking operation may include determining that a result of a particular cryptographic operation has a length that meets one or more criteria. The one or more criteria may include at least one of: an upper length threshold, a lower length threshold, a length range, or a length value. The result checking module 264 may determine an occurrence of a security vulnerability and/or a data processing error when the result of the particular cryptographic operation fails to meets the one or more one or more criteria.

In one example, the cryptography API 248 may include a temporary entry point object (TEPO) module 266. The TEPO module may generate a transient object handle. A transient object handle may serve as a reference or pointer to an object stored in transient memory. The transient object handle may provide temporary access and use of an object stored in non-persistent, or transient, memory. In one example, an SE application object 252 may call the TEPO module 266 to generate a transient object handle that points to an object utilized by the SE application object 252 in a cryptographic operation. The TEPO module 266 may be utilized to avoid persistent memory writes of data pertaining to cryptographic operations. In one example, a transient object handle may point to an output of a first cryptographic operation that is utilized as an input for a second cryptographic operation. In one example, a first transient object handle may point to a KA shared secret (e.g., generated by the KA module 256) that is utilized by the combination function module 260 and a second transient object handle may point to a KEM shared secret (e.g., generated by the KEM module 258) that is utilized by the combination function module 260. By using the TEPO module 266 to generate transient object handles, the JCRE ensures that it can read and manipulate objects in transient memory without writing any changes back to the persistent memory. This avoids unnecessary writes to the persistent memory, which improves security of the cryptographic operations.

In one example, the cryptography API 248 may include a shareable interface object (SIO) module 268. An SIO module 268 may be executable to generate one or more SIOs that facilitate secure communication and interaction between different SE applications. The respective SE applications may be logically isolated, for example, within an LSE 208, to prevent unauthorized access to respective data and/or functions. An SIO provides a controlled mechanism to share data and functionality across SE applications without violating isolation protocols. Access to an SIO may be subject to an access control mechanisms defined in the SE platform. According to the access control mechanism, an SE application may be required to have appropriate permissions to access and use an SIO.

In one example, the various parameters may be configured for use by one or more of the cryptography modules 250 may include selection of the particular algorithm(s) utilized by one or more of the cryptography modules 250. In one example, the particular algorithm(s) to be utilized by the one or more cryptography modules 250 may be determined based on a mode of operation passed to the cryptography API 248. Additionally, the private key(s) and public key(s) to be utilized by the cryptography API 248 may be passed to the cryptography API 248 in "raw" format, such as in the form of a byte array, thereby allowing the keys to be transferred directly into operations executed by the cryptography API 248. Additionally, or in the alternative, a random data generation object may be passed to the cryptography API 248. Additionally, or in the alternative, a shared secret may be passed to the cryptography API 248. Additionally, or in the alternative, a key wrapping algorithm may be passed to the cryptography API 248. Additionally, or in the alternative, a key wrapping algorithm may be passed to the cryptography API 248. The random data generation object, the key wrapping algorithm, or the key wrapping algorithm may be respectively passed to the cryptography API 248 as a Java Card object or in a "raw" format, such as in the form of a byte array. Additionally, or in the alternative, a number of shared secrets that are utilized by a combination algorithm, for example, to generate a combined KA-KEM shared secret, may be passed to the cryptography API 248. In one example, the cryptography API 248 may include a function to add one or more additional shared secrets.

Referring now to FIG. 2C, example configurations of a SE hardware 202 are further described. As shown in FIG. 2C, and as described above with reference to FIG. 2A, LSE 208*a* may include one or more SE applications for performing cryptographic operations. The cryptography API 248 may be used to generate, configure, and/or select one or more cryptography modules 250 for execution within a particular SE application. Additionally, or in the alternative, SE applications may call the cryptography API 248 to access and execute one or more cryptography modules 250. Additionally, or in the alternative, one or more cryptography modules 250 may be incorporated into one or more SE applications.

In one example, LSE 208a may include a shared secret generation applet 270. The shared secret generation applet 270 may access the shared secret generation module 254 from the cryptography API 248. The shared secret generation applet 270 may execute the shared secret generation module 254 within LSE 208a. Additionally, or in the alternative, the shared secret generation module 254 may be incorporated into the shared secret generation applet 270. Further, LSE 208a may include shared secret data 272. The shared secret generation applet 270 may generate shared secrets by executing one or more cryptographic algorithms. The shared secret generation applet 270 may generate shared secrets utilizing shared secret data 272 as inputs. Additionally, or in the alternative, the shared secrets generated by the shared secret generation applet 270 may be stored as shared secret data 272. In one example, a shared secret generated by the shared secret generation applet 270 may be utilized as an encryption key. Additionally, or in the alternative, the shared secret generation applet 270 may generate an encryption key that includes, or is based on, a shared secret.

In one example, the cryptographic algorithms executed by the shared secret generation applet 270 may include one or more KA algorithms and/or one or more KEM algorithms. Additionally, or in the alternative, the cryptographic algorithms may include one or more hybrid algorithms. A hybrid algorithm may include a combination of one or more KA algorithms and one or more KEM algorithms. The particular cryptographic algorithms may be selected from among a set of cryptographic algorithms, such as a set of KA algorithms and/or a set of KEM algorithms. One or more cryptographic algorithms may be incorporated into the shared secret applet. Additionally, or in the alternative, one or more cryptographic algorithms may be stored as shared secret data 272. In one example, a plurality of cryptographic algorithms may be incorporated into the shared secret generation applet 270 and/or shared secret data 272, and may be executed within LSE 208a. In one example, a plurality of cryptographic algorithms may be incorporated into different applets that are executed within respectively different LSEs. The particular cryptographic operations and/or the particular applets to be executed may be selected by the cryptography module 250.

In one example, LSE 208a may additionally or alternatively include a KA applet 274. The KA applet 274 may access the KA module 256 from the cryptography API 248. The KA applet 274 may execute the KA module 256 within LSE 208a. Additionally, or in the alternative, the KA module 256 may be incorporated into the KA applet 274. Further, LSE 208a may include KA data 276. The KA applet 274 may generate KA shared secrets by executing one or more KA algorithms. The KA applet 274 may generate KA shared secrets utilizing KA data 276 as inputs. Additionally, or in the alternative, the KA shared secrets generated by the KA applet 274 may be stored as KA data 276. The one or more KA algorithms may be incorporated into the KA applet 274. Additionally, or in the alternative, the one or more KA algorithms may be selected by the KA applet 274 from a set of KA algorithms. The set of KA algorithms may be stored, for example, as KA data 276.

Additionally, or in the alternative, in one example, LSE 208a may include a KEM applet 278. The KEM applet 278 may access the KEM module 258 from the cryptography API 248. The KEM applet 278 may execute the KEM module 258 within LSE 208a. Additionally, or in the alternative, the KEM module 258 may be incorporated into the KEM applet 278. Further, LSE 208a may include KEM data 280. The KEM applet 278 may generate KEM shared secrets by executing one or more KEM algorithms. The KEM applet 278 may generate KEM shared secrets utilizing KEM data 280 as inputs. Additionally, or in the alternative, the KEM shared secrets generated by the KA applet 274 may be stored as KEM data 280. The one or more KEM algorithms may be incorporated into the KEM applet 278. Additionally, or in the alternative, the one or more KEM algorithms may be selected by the KEM applet 278 from a set of KEM algorithms. The set of KEM algorithms may be stored, for example, as KEM data 280.

In one example, a plurality of shared secrets may be combined to generate a combined shared secret. In one example, a KA shared secret and a KEM shared secret may be combined to generate a combined shared secret. LSE 208a may generate combined shared secrets. LSE 208a may include a combination function applet 282. The combination function applet 282 may access the combination function module 260 from the cryptography API 248. The combination function applet 282 may execute the combination function module 260 within LSE 208a. Additionally, or in the alternative, the combination function module 260 may be incorporated into the combination function applet 282. Further, LSE 208a may include combination function data 284. The combination function applet 282 may generate combined KA-KEM shared secrets by executing one or more combination algorithms. The combination function applet 282 may generate combined KA-KEM shared secrets utilizing combination function data 284 as inputs. Additionally, or in the alternative, the combined KA-KEM shared secrets generated by the combination function applet 282 may be stored as combination function data 284. The one or more combination algorithms may be incorporated into the combination function applet 282. Additionally, or in the alternative, the one or more combination algorithms may be selected by the combination function applet 282. From a set of combination algorithms. The set of combination algorithms may be stored, for example, as combination function data 284. In one example, a combined shared secret generated by combination function applet 282 may be utilized as an encryption key. Additionally, or in the alternative, the combination function applet 282 may generate an encryption key that includes, or is based on, a combined shared secret.

In one example, the combination function applet 282 may utilize a KA shared secret and/or a KEM shared secret as inputs for a combination algorithm. The KA applet 274 may generate a KA shared secret, and the combination function applet 282 may utilize the KA shared secret as an input for a combination algorithm. Additionally, or in the alternative, the KEM applet 278 may generate a KEM shared secret, and the combination function applet 282 may utilize the KEM shared secret as an input for the combination algorithm.

In one example, the combination function applet 282 may include one or more KA algorithms and/or one or more KEM algorithms that are executed within LSE 208a. For example, the combination function applet 282 may reflect a combination of the KA applet 274, the KEM applet 278, and a combination algorithm. In one example, the KA shared secret, the KEM shared secret, and the combined shared secret may be generated within LSE 208a. The combined shared secret may be provided as an output from LSE 208a. The KA shared secret and the KEM shared secret utilized to generate the combined shared secret may remain within LSE 208a. The KA shared secret and the KEM shared secret may be stored as combination function data 284 and/or may be discarded after generation of the combined shared secret.

In one example, the SE hardware 202 may include one or more SIOs 286. The one or more SIOs may be generated by the SIO module 268. In one example, the combination function applet 282 may utilize SIO 286a to instruct the KA applet 274 to generate a KA shared secret and/or to obtain the KA shared secret from the KA applet 274. Additionally, or in the alternative, the combination function applet 282 may utilize SIO 286n to instruct the KEM applet 278 to generate a KEM shared secret and/or to obtain the KEM shared secret from the KEM applet 278.

Referring further to FIGS. 2A-2C, in one example, the SE hardware 202 may be configured in a manner that provides for domain separation prevent unintended interactions or interferences. Data for domain separation may be input via the cryptography API 248. The data for domain separation may include protocol information. Additionally, or alternatively, the data for domain separation may include pre-shared keys. The protocol information may include header information or specific fields within data packets that indicate a particular protocol being used. The pre-shared keys may be utilized to separate different domains. In one example, multiple computing entities may interact with the SE hardware using distinct pre-shared keys for each interaction or for each distinct computing entity. The use of distinct pre-shared keys helps ensure that data associated with a particular computing entity remains separate and secure from data associated with other computing entities. Thus, the SE hardware 202 may appropriately route, process, and secure data within its intended domain without interference or compromise from other domains.

4. Example Cryptographic Operations and Algorithms

Referring now to FIGS. 3A-3D, example cryptographic operations 300 are further described. The example cryptographic operations 300 may be performed using one or more cryptographic algorithms. In one example, the cryptographic operations 300 may include selecting one or more cryptographic algorithms from a set of cryptographic algorithms.
A. Example Cryptographic Operations.

The cryptographic operations 300 described with reference to FIGS. 3A-3D may be executed with one or more components of the system 100 described with reference to FIG. 1 and/or with one or more components of the computing entity 200 described with reference to FIGS. 2A-2C. For example, the cryptographic operations 300 may be executed in a SE platform runtime environment, and/or in one or more LSEs of the SE platform runtime environment, for example, utilizing one or more cryptography modules 250 described with respect to FIGS. 2A-2C. One or more cryptographic operations 300 described with reference to FIGS. 3A-3D may be modified, rearranged, or omitted all together. Accordingly, the particular sequence of operations described with reference to FIGS. 3A-3D should not be construed as limiting the scope of one or more embodiments. As shown in FIGS. 3A-3D, the cryptographic operations 300 are described with reference to computing entity A (CE-A) 302 and computing entity B (CE-B) 304. In one example, the cryptographic operations 300 described with reference to CE-A 302 and CE-B 304 may be reversed.

Figure 3A:
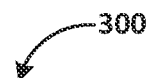
FIGS. 3A-3D show diagrams that illustrate example cryptographic operations in accordance with one or more embodiments.

Referring to FIG. 3A, example cryptographic operations 300 pertaining to a KA algorithm are described. As shown in FIG. 3A, CE-A 302 may generate a public-private key pair "A" (operation 306). The public-private key pair "A" may include public key "A" and a private key "A." CE-A 302 may transmit public key "A" to CE-B 304 (operation 308). Meanwhile, CE-B 304 may generate a public-private key pair "B" (operation 310). The public-private key pair "B" may include public key "B" and a private key "B." CE-A 304 may transmit public key "B" to CE-A 302 (operation 312). The public-private key pair "A" may be a long-term, or static, key pair that is used for an extended period of time or for multiple cryptographic operations 300. Alternatively, the public-private key pair "A" may be an ephemeral key pair that is used for a short period of time or for a single cryptographic operation 300. Additionally, or alternatively, The public-private key pair "B" may be a static key pair that is used for an extended period of time or for multiple cryptographic operations 300. Alternatively, the public-private key pair "B" may be an ephemeral key pair that is used for a short period of time or for a single cryptographic operation 300.

CE-A 302 may combine the private key "A" with public key "B" to generate a KA shared secret (operation 316). Meanwhile, CE-B 304 may combine the private key "B" with public key "A" to generate the KA shared secret (operation 320). CE-A 302 and CE-B 304 may engage in secure communications using the KA shared secret (operation 322). The KA shared secret may be utilized as an encryption key to encrypt messages transmitted between CE-A 302 and CE-B 304. Additionally, or in the alternative, CE-A 302 and CE-B 304 may generate an encryption key that includes or that is based on the KA shared secret.

Figure 3B:

Referring to FIG. 3B, example cryptographic operations 300 pertaining to a KEM algorithm are described. As shown in FIG. 3B, CE-A 302 may generate a public-private key pair "C" (operation 330). The public-private key pair "C" may include public key "C" and a private key "C." CE-A 302 may transmit public key "C" to CE-B 304 (operation 332). CE-B 304 may generate a KEM shared secret (operation 334) and CE-B 304 may encapsulate the KEM shared secret with public key "C" to generate a ciphertext (operation 336). CE-B 304 may transmit the ciphertext to CE-A 302 (operation 338). CE-A 302 may decapsulate the ciphertext with private key "C" to obtain the KEM shared secret (operation 340). CE-A 302 and CE-B 304 may engage in secure communications using the KEM shared secret (operation 342). The KEM shared secret may be utilized as an encryption key to encrypt messages transmitted between CE-A 302 and CE-B 304. Additionally, or in the alternative, CE-A 302 and CE-B 304 may generate an encryption key that includes or that is based on the KEM shared secret.

Figures 1, 3C:
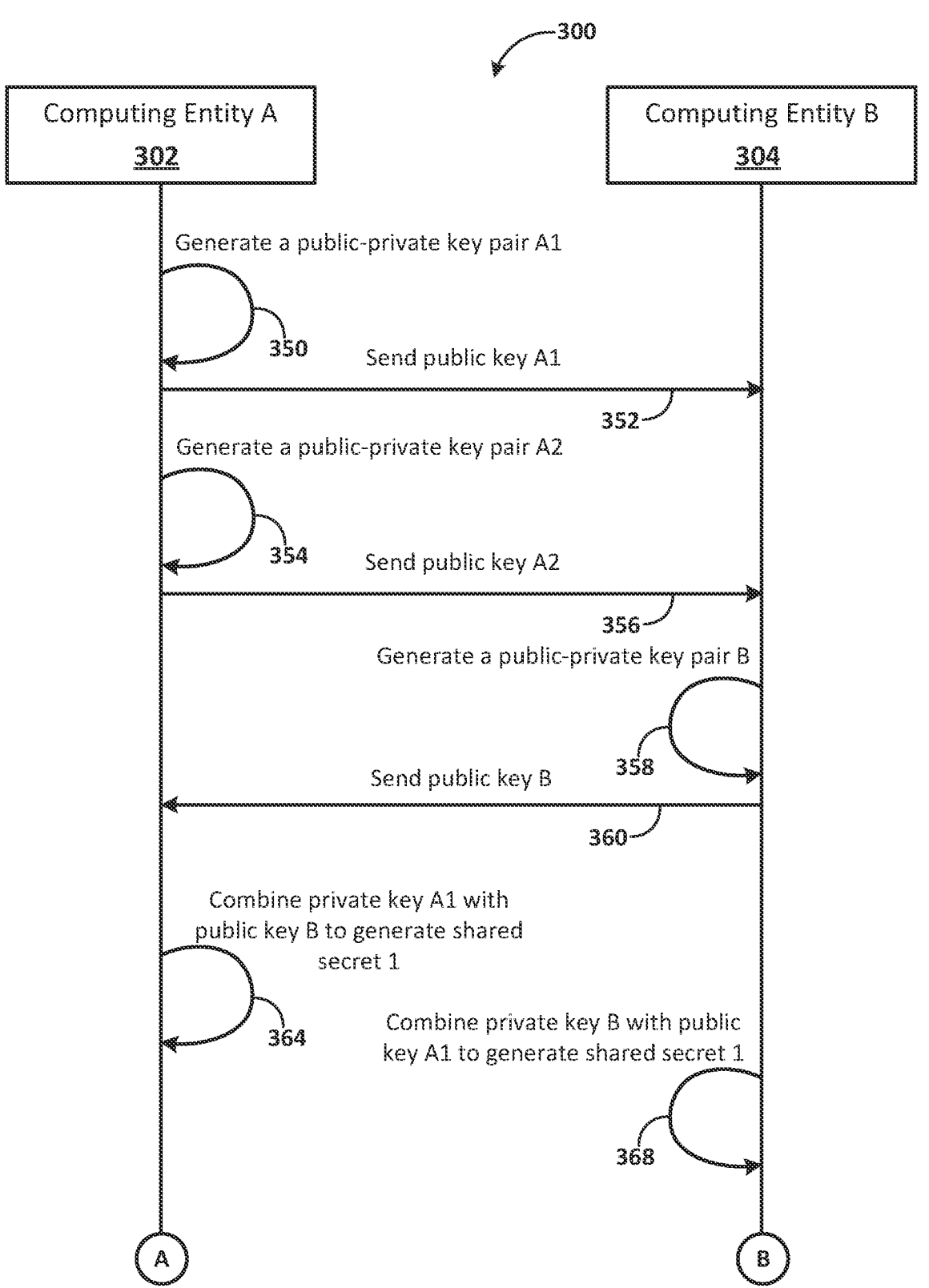
Figures 2, 3C:
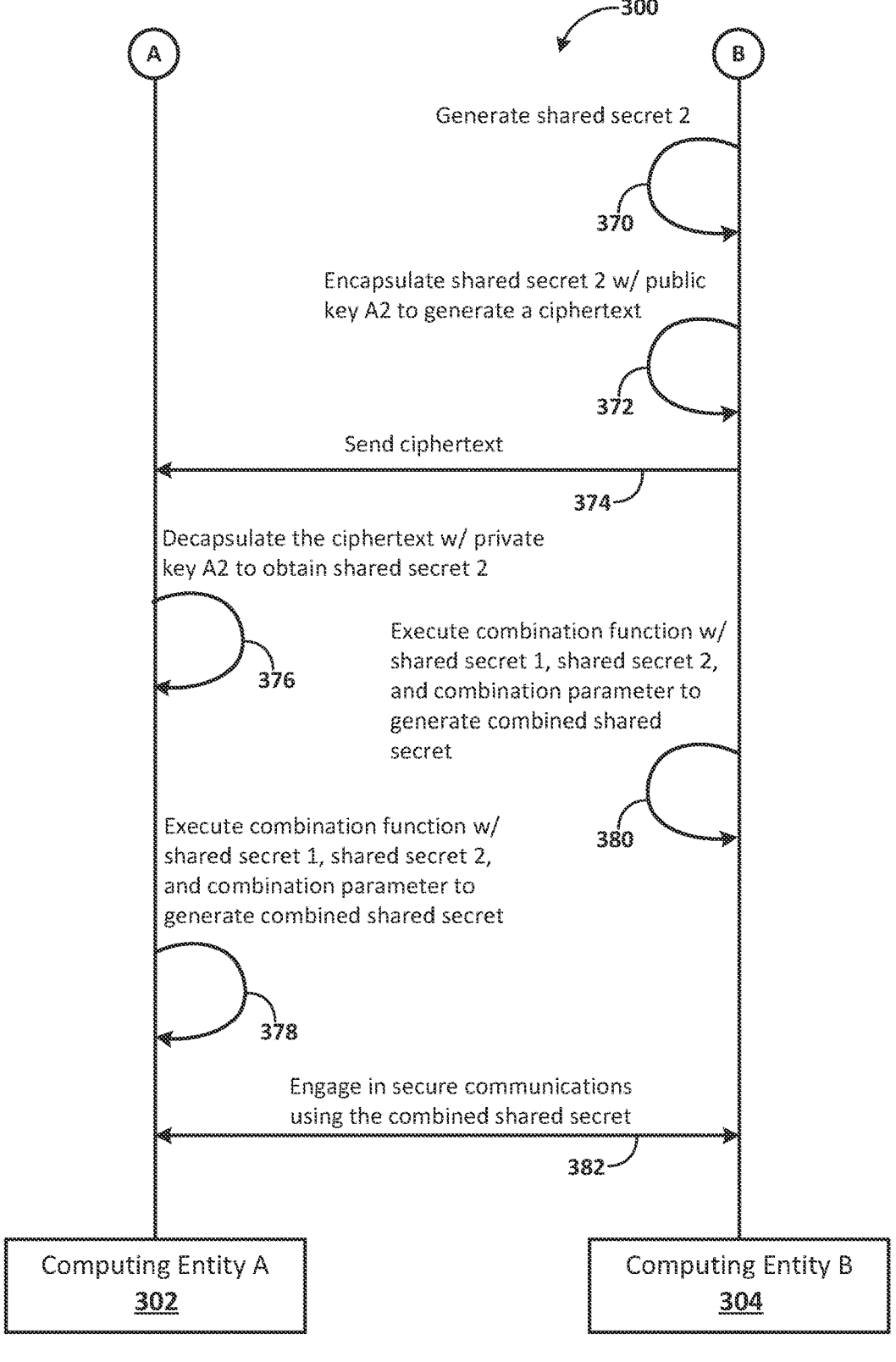

Referring to FIGS. 3C-1 and 3C-2, example cryptographic operations 300 pertaining to a hybrid KA-KEM algorithm are described.

As shown in FIG. 3C-1, CE-A 302 may generate a public-private key pair "A1" (operation 350). The public-private key pair "A1" may include public key "A1" and a private key "A1." CE-A 302 may transmit public key "A1" to CE-B 304 (operation 352). Additionally, CE-A 302 may generate a public-private key pair "A2" (operation 354). The public-private key pair "A2" may include public key "A2" and a private key "A2." CE-A 302 may transmit public key "A2" to CE-B 304 (operation 356). Meanwhile, CE-B 304 may generate a public-private key pair "B" (operation 358). The public-private key pair "B" may include public key "B"

and a private key "B." CE-A 304 may transmit public key "B" to CE-A 302 (operation 360).

CE-A 302 may combine the private key "A" with public key "B" to generate shared secret "1" (e.g., a KA shared secret) (operation 364). Meanwhile, CE-B 304 may combine the private key "B" with public key "A1" to generate the shared secret "1" (e.g., a KA shared secret) (operation 368).

Continuing with FIG. 3C-2, CE-B 304 may generate shared secret "2" (e.g., a KEM shared secret) (operation 370) and CE-B 304 may encapsulate the shared secret "2" with public key "A2" to generate a ciphertext (operation 372). CE-B 304 may transmit the ciphertext to CE-A 302 (operation 374). CE-A 302 may decapsulate the ciphertext with private key "A2" to obtain the shared secret "2" (operation 376). CE-A 302 may execute a combination function with shared secret "1" (e.g., the KA shared secret), shared secret "2" (e.g., the KEM shared secret), and a combination parameter, to generate a combined shared secret (operation 378). Meanwhile, CE-A 304 may execute the combination function with shared secret "1" (e.g., the KA shared secret), shared secret "2" (e.g., the KEM shared secret), and the combination parameter, to generate the combined shared secret (operation 380). CE-A 302 and CE-B 304 may engage in secure communications using the combined shared secret (operation 382). The combined shared secret may be utilized as an encryption key to encrypt messages transmitted between CE-A 302 and CE-B 304. Additionally, or in the alternative, CE-A 302 and CE-B 304 may generate an encryption key that includes or that is based on the combined shared secret.

Figure 3D:
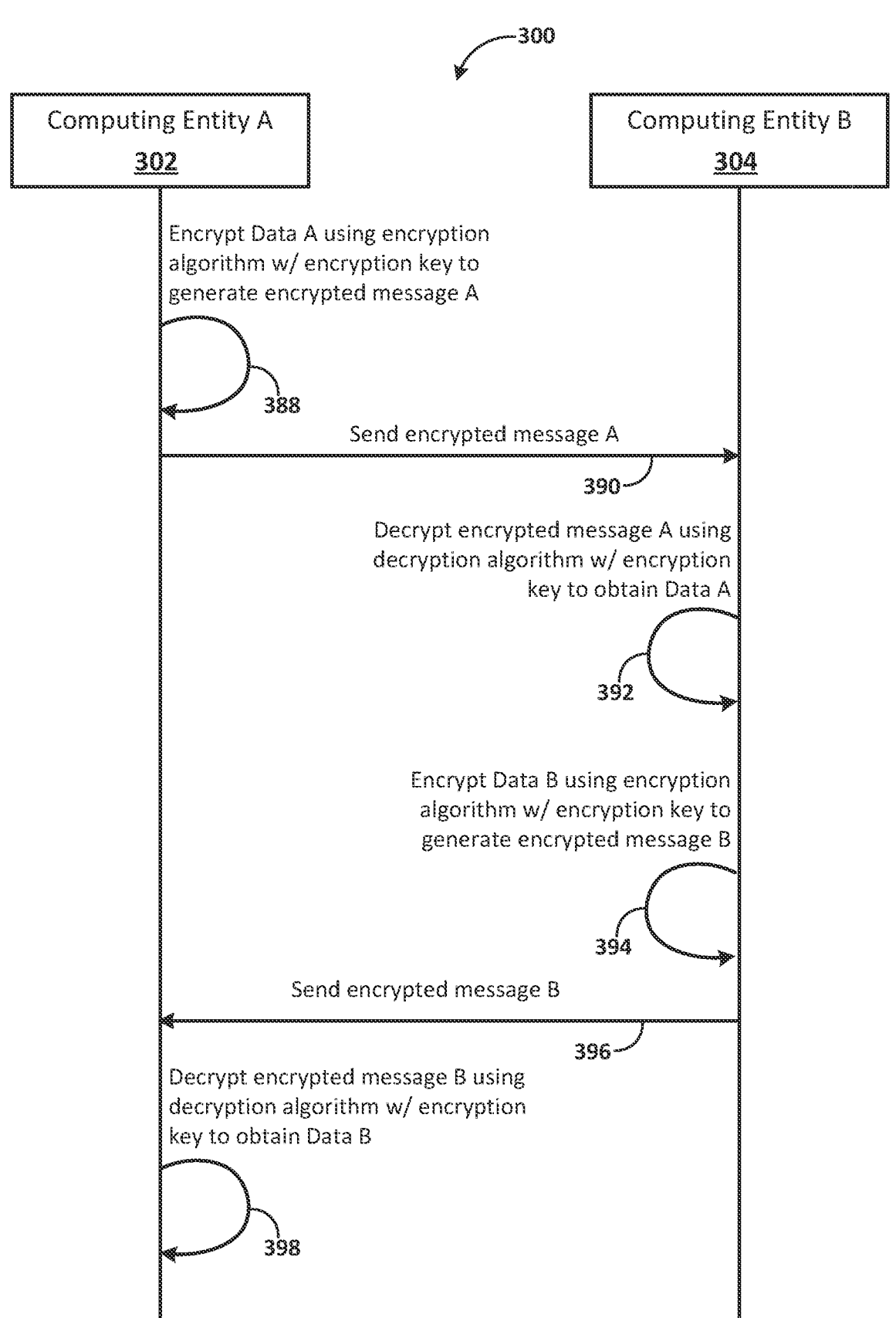

Referring to FIG. 3D, example cryptographic operations 300 pertaining to encrypting and/or decrypting data with an encryption key are described. In one example, CE-A 302 may encrypt data "A" using an encryption algorithm, with an encryption key as an input to the encryption algorithm, to generate an encrypted message "A" (operation 388). The encryption key may be, may include, or may be based on, at least one of: the combined shared secret, the KA shared secret, or the KEM shared secret. CE-A 302 may transmit encrypted message "A" to CE-B 304 (operation 390). CE-B 304 may decrypt encrypted message "A" using a decryption algorithm, with the encryption key as an input to the decryption algorithm, to obtain data "A" (operation 392). Additionally, or in the alternative, CE-B 304 may encrypt data "B" using the encryption algorithm, with the encryption key as an input to the encryption algorithm, to generate an encrypted message "B" (operation 394). As mentioned, the encryption key may include, or may be based on, at least one of: the combined shared secret, the KA shared secret, or the KEM shared secret. CE-B 304 may transmit encrypted message "B" to CE-A 302 (operation 396). CE-A 302 may decrypt encrypted message "B" using the decryption algorithm, with the encryption key as an input to the decryption algorithm, to obtain data "B" (operation 392).

B. Example Cryptographic Algorithms.

The cryptographic operations 300 may be performed using one or more cryptographic algorithms. The one or more cryptographic algorithms utilized in a cryptographic operation 300 may include one or more quantum-resistant cryptographic algorithms, one or more legacy cryptographic algorithms, or a combination of these.

As used herein, the term "quantum-resistant" or "post-quantum," when used in connection with a cryptographic algorithm, refers to a cryptographic algorithm that is designed to resist attacks by quantum computing devices or systems.

Example quantum-resistant cryptographic algorithms include: lattice-based cryptographic algorithms (e.g., Kyber algorithms, Cryptographic Suite for Algebraic Lattices (CRYSTALS) algorithms, NTRUEncrypt algorithms, Learning With Errors (LWE) algorithms), code-based cryptographic algorithms (e.g., McEliece algorithms, Niederreiter Cryptosystem algorithms), multivariate polynomial cryptographic algorithms (e.g., Rainbow algorithms), quantum-resistant hash-based cryptographic algorithms (e.g., eXtended Merkle Signature Scheme (XDMSS) algorithms, Stateful Hash-Based Signature (SPHINCS) algorithms), Isogeny-Based cryptographic algorithms, or cryptographic primitive algorithms (e.g., Round5 algorithms).

As used herein, the term "legacy," when used in connection with a cryptographic algorithm, refers to a cryptographic algorithm that is not specifically designed to resist attacks by quantum computing devices or systems. Legacy cryptographic algorithms may include algorithms that have been in use for an extended period of time. A particular legacy cryptographic algorithm may be suitable for some cryptographic operations, for example, even if the particular legacy algorithm may have known limitations for vulnerabilities in the context of threats from quantum computing systems.

Example legacy cryptographic algorithms include: Data Encryption Standard (DES) algorithms, RSA (Rivest-Shamir-Adleman) algorithms, Elliptic Curve Cryptography (ECC) algorithms, Diffie-Hellman (DH) algorithms, Edwards-curve Digital Signature Algorithm (EdDSA) algorithms, Triple DES (3DES) algorithms, Advanced Encryption Standard (AES) algorithms, Digital Signature Algorithm (DSA) algorithms, legacy hash function algorithms (e.g., MD5, SHA-1, SHA-2 (e.g., SHA-256 or SHA-512), and SHA-3), and stream cipher algorithms. Legacy hash function algorithms may be configured as concatenation hash functions or as cascading hash functions.

In one example, a cryptographic algorithm may include a KA algorithm. Example KA algorithms include one or more of the cryptographic algorithms mentioned above, such as one or more of the legacy cryptographic algorithms and/or one or more of the quantum-resistant cryptographic algorithms mentioned above. In one example, a KA algorithm may include a legacy KA algorithm, such as: a DH algorithm, an Elliptic Curve Diffie-Hellman (ECDH) algorithm (e.g., X25519 elliptic curve algorithms, X488 elliptic curve algorithms), or an RSA algorithm. In one example, a KA algorithm may include a quantum-resistant cryptographic algorithm, such as: a supersingular isogeny Diffie-Hellman (SIDH) algorithm.

In one example, a cryptographic algorithm may include a KEM algorithm. Example KEM algorithms may include one or more of the quantum-resistant cryptographic algorithms mentioned above. In one example, a KEM algorithm may include a quantum-resistant cryptographic algorithm, such as: a lattice-based cryptographic algorithm, a code-based cryptographic algorithm, a multivariate polynomial cryptographic algorithm, a quantum-resistant hash-based cryptographic algorithm, an isogeny-based cryptographic algorithm, or a cryptographic primitive algorithm.

In one example, a cryptographic algorithm may include a hybrid algorithm. Example hybrid algorithms may include a KA algorithm and a KEM algorithm. The KA algorithm and the KEM algorithm may be combined using a combination algorithm. The KA algorithm may include a legacy cryptographic algorithm or a quantum-resistant cryptographic algorithm. The KEM algorithm may include a quantum-resistant cryptographic algorithm.

5. Example Secure Element Applications

Referring now to FIGS. 4A-4G, example cryptography modules 400 are further described. The cryptography modules 400 described with reference to FIGS. 4A-4G may be included in the set of cryptography modules 250 described with reference to FIGS. 2A-2C. Additionally, or in the alternative, the cryptography modules 400 described with reference to FIGS. 4A-4G may be incorporated into one or more SE applications, or applets, described with reference to FIGS. 2A-2C. The cryptography modules 400 described with reference to FIGS. 4A-4G may be executed within the SE runtime environment, such as the JCRE 240 described with reference to FIGS. 2A-2C. In one example, the system may include multiple cryptography modules 400. One or more cryptographic operations may be performed by executing one or more cryptography modules 400 within the SE platform runtime environment. In one example, a particular cryptography module 400 may be executed and/or incorporated into a particular LSE. A set of cryptographic operations may be performed by executing a particular cryptography module 400. Additionally, or in the alternative, each particular cryptographic operation may be performed by a separate cryptography module 400. A cryptography module 400 may include one or more submodules. Each submodule may perform a cryptographic operation, a portion of a cryptographic operation, and/or other operations that pertain to a cryptographic operation. with the cryptography API 248 may be used to generate, configure, and/or select one or more of the cryptography modules 400 for execution, for example, in the JCRE 240 (FIG. 2B) and/or in one or more LSEs 208a-n (FIG. 2C).

A. Example Key Pair Modules.

Figure 4A:
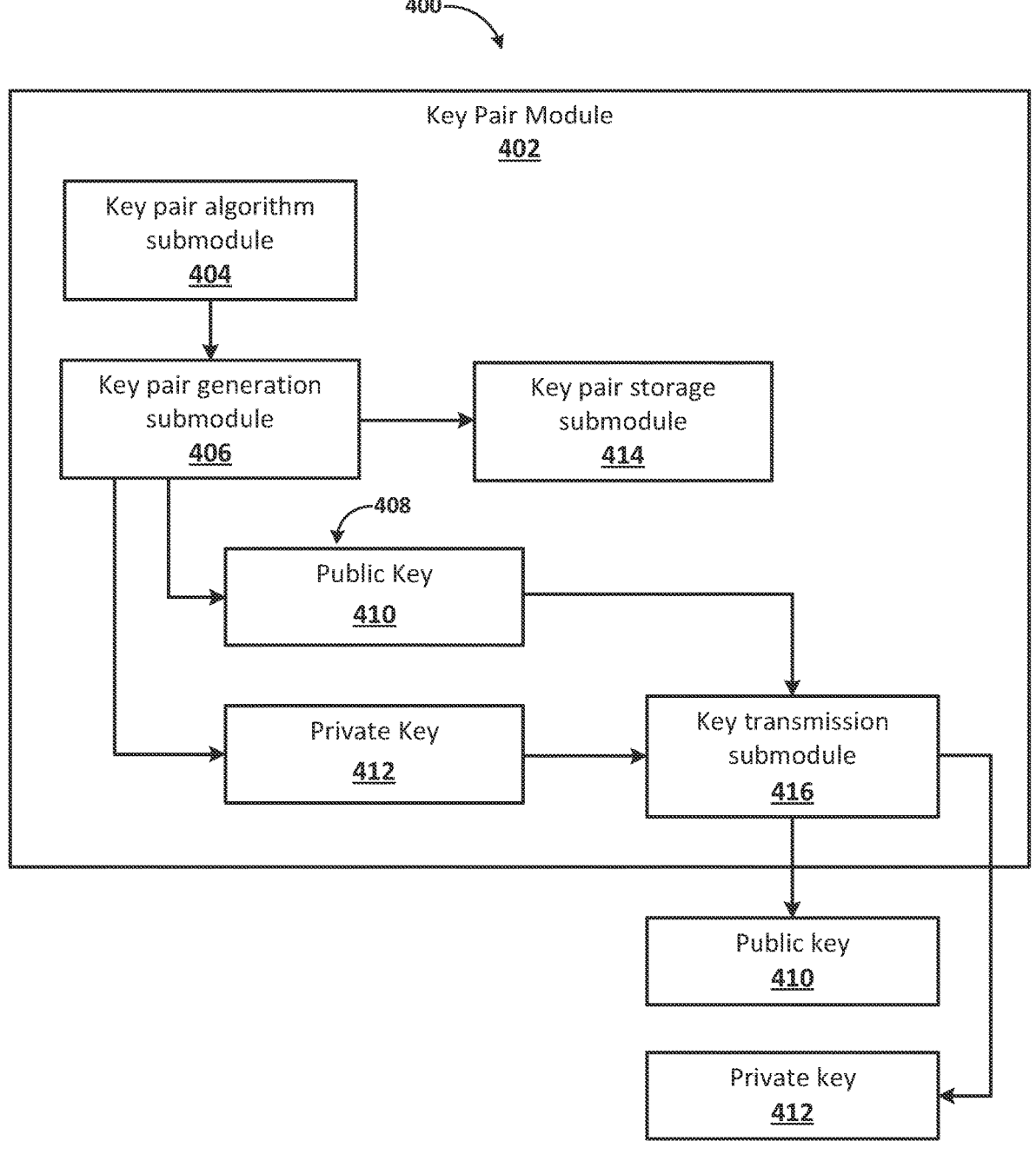
FIGS. 4A-4G show diagrams that illustrate example secure element applications in accordance with one or more embodiments.

As shown in FIG. 4A, a cryptography module 400 may include a key pair module 402. The key pair module 402 may generate key pairs for use in cryptographic operations. The key pair module 402 may include a key pair algorithm submodule 404 and a key pair generation submodule 406. The key pair algorithm submodule 404 may provide a cryptographic algorithm to the key pair generation submodule 406 for generating a key pair 408. In one example, a cryptographic algorithm for generating a key pair 408 may be stored in the key pair algorithm submodule 404. Additionally, or in the alternative, the key pair algorithm submodule 404 may select a cryptographic algorithm for generating a key pair 408 from a set of cryptographic algorithms. The cryptographic algorithm may be a quantum-resistant cryptographic algorithm or a legacy cryptographic algorithm. The key pair generation submodule 406 may generate a key pair 408 using the cryptographic algorithm provided by the key pair algorithm submodule 404. The key pair 408 may include a public key 410 and a private key 412.

The key pair module 402 may further include a key pair storage submodule 414 and/or a key transmission submodule 416. The key pair storage submodule 414 may store the key pair 408 for future reference, for example, by one or more cryptography modules 400. The key transmission submodule 416 may transmit the public key 410 and/or the private key 412, for example, to another cryptography module 400, or to another component of the computing entity within which the cryptography module 400 is executing.

B. Example KA Shared Secret Modules.

Figure 4B:
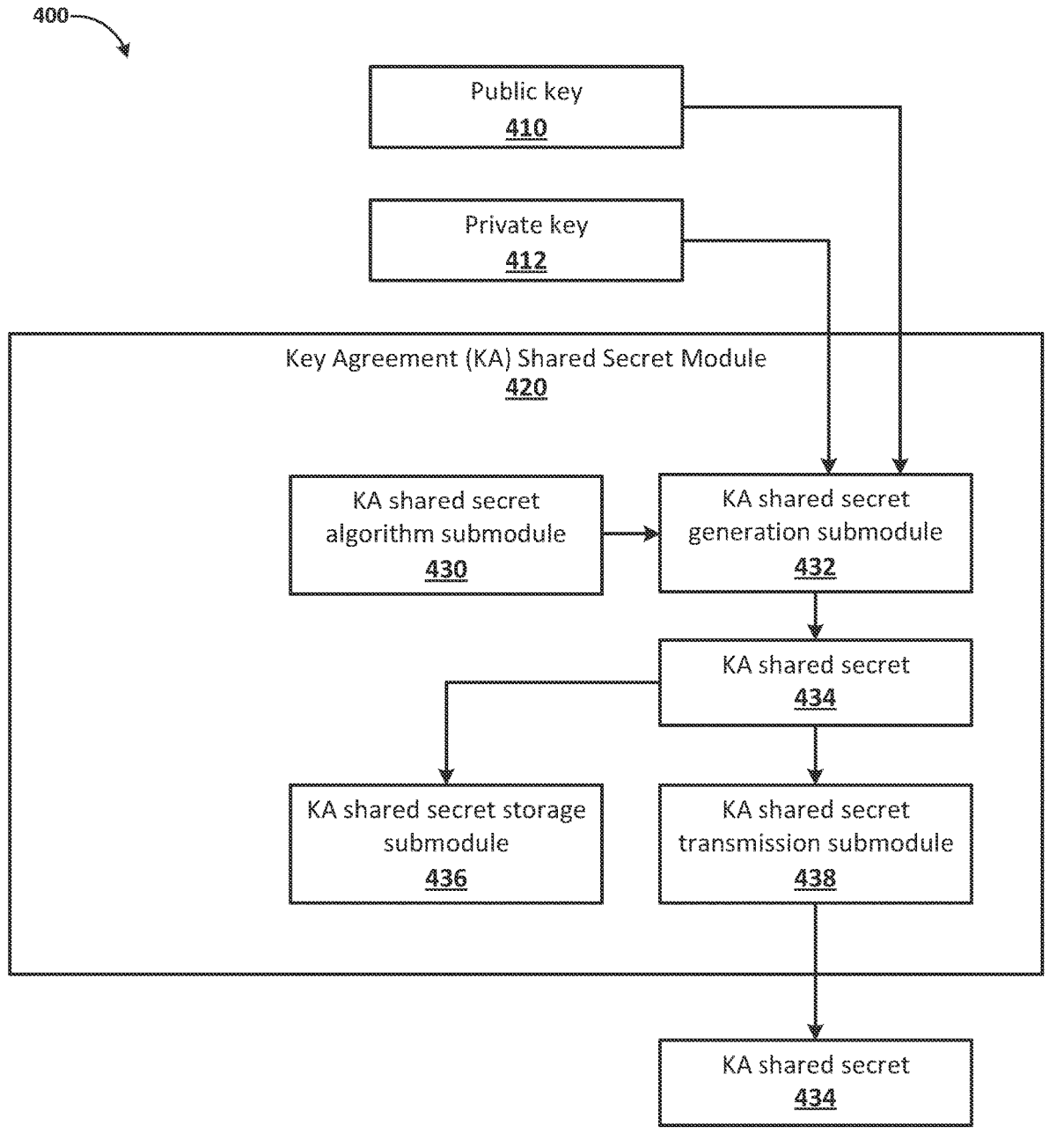

As shown in FIG. 4B, a cryptography module 400 may include a KA shared secret module 420. The KA shared secret module 420 may generate KA shared secrets for use as encryption keys and/or for use in subsequent cryptographic operations. The KA shared secret module 420 may include a KA shared secret algorithm submodule 430 and a KA shared secret generation submodule 432. The KA shared secret algorithm submodule 430 may provide a cryptographic algorithm to the KA shared secret generation submodule 432 for generating a KA shared secret 434.

In one example, a cryptographic algorithm for generating a KA shared secret 434 may be stored in the KA shared secret algorithm submodule 430. Additionally, or in the alternative, the KA shared secret algorithm submodule 430 may select a cryptographic algorithm for generating a KA shared secret 434 from a set of cryptographic algorithms. The cryptographic algorithm may be a quantum-resistant cryptographic algorithm or a legacy cryptographic algorithm. The KA shared secret generation submodule 432 may generate a KA shared secret 434 using the cryptographic algorithm provided by the KA shared secret algorithm submodule 430, a private key 412 corresponding to a first computing entity, and a public key 410 corresponding to a second computing entity. The private key 412 utilized by the KA shared secret algorithm submodule 430 may be provided by a key pair module 402 (FIG. 4A) corresponding to a first computing entity. In one example, the key transmission submodule 416 (FIG. 4A) may transmit the private key 412 to the KA shared secret module 420, such as to the KA shared secret generation submodule 432. The public key 410 utilized by the KA shared secret algorithm submodule 430 may be provided by a second computing entity. In one example, the public key 410 may be provided by a key pair module 402 (FIG. 4A) corresponding to the second computing entity. The second computing entity may transmit the public key 410 to the first computing entity. In one example, a key transmission submodule 416 (FIG. 4A) corresponding to the second computing entity may transmit the public key 410 to the first computing entity, such as to the KA shared secret module 420 or the KA shared secret generation submodule 432 of the first computing entity.

The KA shared secret module 420 may further include a KA shared secret storage submodule 436 and/or a KA shared secret transmission submodule 438. The KA shared secret storage submodule 436 may store the KA shared secret 434 for future reference, for example, by one or more cryptography modules 400. The KA shared secret transmission submodule 438 may transmit the KA shared secret 434, for example, to another cryptography module 400, or to another component of the computing entity within which the cryptography module 400 is executing.

C. Example KEM Modules.

Figure 4C:
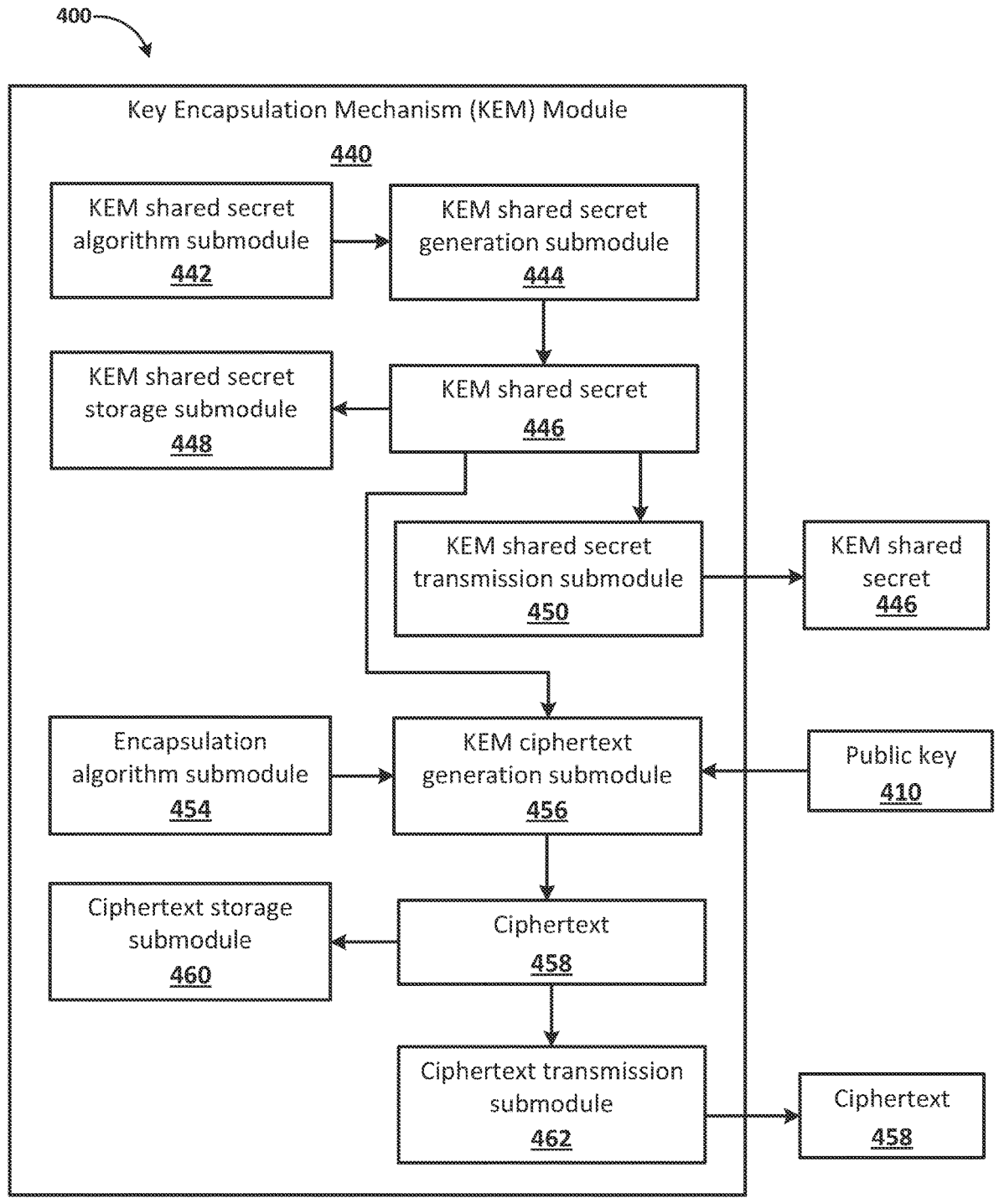

As shown in FIG. 4C, a cryptography module 400 may include a KEM module 440. The KEM module 440 may generate KEM shared secrets for use as encryption keys and/or for use in subsequent cryptographic operations. The KEM module 440 may include a KEM shared secret algorithm submodule 442 and a KEM shared secret generation submodule 444. The KEM shared secret algorithm submodule 442 may provide a cryptographic algorithm to the KEM shared secret generation submodule 444 for generating a KEM shared secret 446. In one example, a cryptographic algorithm for generating a KEM shared secret 446 may be stored in the KEM shared secret algorithm submodule 442. Additionally, or in the alternative, the KEM shared secret algorithm submodule 442 may select a cryptographic algorithm for generating a KEM shared secret 446 from a set of cryptographic algorithms. The cryptographic algorithm may be a quantum-resistant cryptographic algorithm or a legacy cryptographic algorithm. The KEM shared secret generation submodule 444 may generate a KEM shared secret 446 using the cryptographic algorithm provided by the KEM shared secret algorithm submodule 442.

The KEM module 440 may further include a KEM shared secret storage submodule 448 and/or a KEM shared secret transmission submodule 450. The KEM shared secret storage submodule 448 may store the KEM shared secret 446 for future reference, for example, by one or more cryptography modules 400. The KEM shared secret transmission submodule 450 may transmit the KEM shared secret 446, for example, to another cryptography module 400, or to another component of the computing entity within which the cryptography module 400 is executing.

As further shown in FIG. 4C, a KEM module 440 may generate ciphertexts. In one example, a KEM module 440 may generate a KEM shared secret and a ciphertext concurrently. A ciphertext may include an encapsulated KEM shared secret. A ciphertext may be utilized, for example, to securely transmit a KEM shared secret to another computing entity. A computing entity that receives a ciphertext may decapsulate the ciphertext to obtain the KEM shared secret, and the KEM share secret may be utilized as an encryption key, or an encryption key may be generated that includes, or that is based on, the KEM shared secret. Additionally, or in the alternative, the KEM shared secret may be utilized in subsequent cryptographic operations.

The KEM module 440 may include an encapsulation algorithm submodule 454 and a KEM ciphertext generation submodule 456. The encapsulation algorithm submodule 454 may provide a cryptographic algorithm to the KEM ciphertext generation submodule 456 for generating a ciphertext 458. In one example, a cryptographic algorithm for generating a ciphertext 458 may be stored in the encapsulation algorithm submodule 454. Additionally, or in the alternative, the encapsulation algorithm submodule 454 may select a cryptographic algorithm for generating a ciphertext 458 from a set of cryptographic algorithms. The cryptographic algorithm may be a quantum-resistant cryptographic algorithm or a legacy cryptographic algorithm. The KEM ciphertext generation submodule 456 may generate a ciphertext 458 from a KEM shared secret 446 using the cryptographic algorithm provided by the encapsulation algorithm submodule 454 to encapsulate the KEM shared secret with a public key 410.

The public key 410 utilized by the KEM ciphertext generation submodule 456 may be provided by the key pair module 402 (FIG. 4A). The public key 410 utilized by the KEM ciphertext generation submodule 456 may be referred to as an encapsulation key. In one example, the key transmission submodule 416 (FIG. 4A) may transmit the encapsulation key to the KEM module 440, such as to the KEM ciphertext generation submodule 456. The KEM shared secret 446 utilized by the KEM ciphertext generation submodule 456 may be provided by the KEM module 440 (FIG. 4C). In one example, the KEM shared secret transmission submodule 450 (FIG. 4C) may transmit the KEM shared secret 446 to the KEM module 440, such as to the KEM ciphertext generation submodule 456.

The KEM module 440 may further include a ciphertext storage submodule 460 and/or a ciphertext transmission submodule 462. The ciphertext storage submodule 460 may store the ciphertext 458 for future reference, for example, by one or more cryptography modules 400. The ciphertext transmission submodule 462 may transmit the ciphertext 458, for example, to another cryptography module 400, or to another component of the computing entity within which the cryptography module 400 is executing.

D. Example KEM Decapsulation Modules.

Figure 4D:
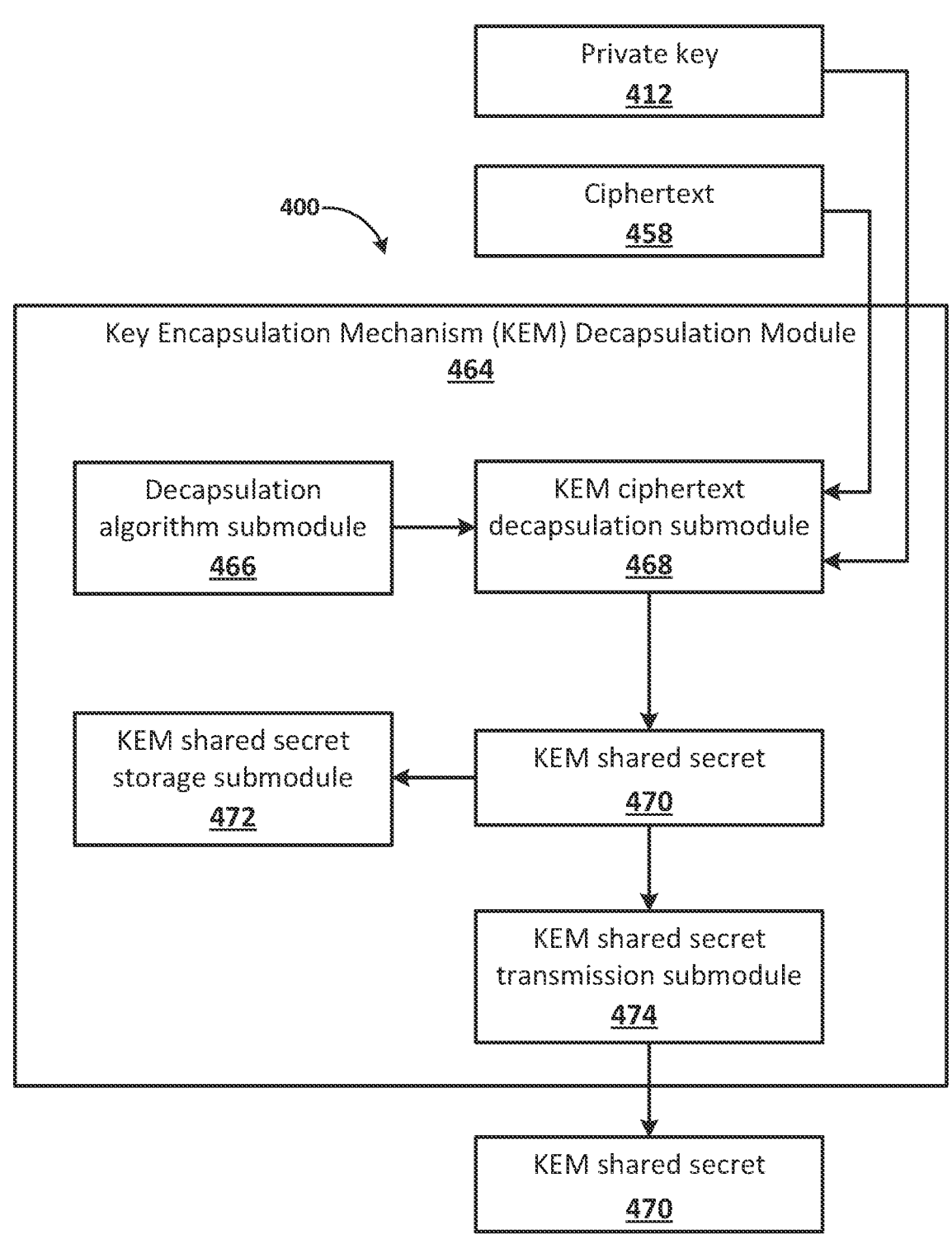

As shown in FIG. 4D, a cryptography module 400 may include a KEM decapsulation module 464. The KEM decapsulation module 464 may obtain KEM shared secrets by decapsulating ciphertexts, such as ciphertexts received from another computing entity. The KEM share secret obtained by decapsulating a ciphertext may be utilized as an encryption key, or an encryption key may be generated that includes, or that is based on, the KEM shared secret. Additionally, or in the alternative, the KEM shared secret may be utilized in subsequent cryptographic operations.

The KEM decapsulation module 464 may include a decapsulation algorithm submodule 466 and a KEM ciphertext decapsulation submodule 468. The decapsulation algorithm submodule 466 may provide a cryptographic algorithm to the KEM ciphertext decapsulation submodule 468 for obtaining a KEM shared secret 470. In one example, a cryptographic algorithm for obtaining a KEM shared secret 470 from a ciphertext 458 may be stored in the decapsulation algorithm submodule 466. Additionally, or in the alternative, the decapsulation algorithm submodule 466 may select a cryptographic algorithm, from a set of cryptographic algorithms, and the selected cryptographic algorithm may be utilized by the Kem ciphertext decapsulation submodule to obtain a KEM shared secret 470. The cryptographic algorithm may be a quantum-resistant cryptographic algorithm or a legacy cryptographic algorithm. The KEM ciphertext decapsulation submodule 468 may obtain a KEM shared secret 470 from a ciphertext 458 by using the cryptographic algorithm provided by the decapsulation algorithm submodule 466 to decapsulate the ciphertext 458 with a private key 412 that corresponds to the public key 410 that was used to generate the ciphertext 458.

The private key 412 utilized by the KEM ciphertext decapsulation submodule 468 may be provided by the key pair module 402 (FIG. 4A). The private key 412 utilized by the KEM ciphertext decapsulation submodule 468 may be referred to as a decapsulation key. In one example, the key transmission submodule 416 (FIG. 4A) may transmit the private key 412 to the KEM decapsulation module 464, such as to the KEM ciphertext decapsulation submodule 468. The ciphertext 458 decapsulated by the KEM ciphertext decapsulation submodule 468 may be provided by another computing entity. In one example, the ciphertext 458 may be generated by a KEM module 440 of another computing entity.

The KEM decapsulation module 464 may further include a KEM shared secret storage submodule 472 and/or a KEM shared secret transmission submodule 474. The KEM shared secret storage submodule 472 may store the KEM shared secret 470 for future reference, for example, by one or more cryptography modules 400. The KEM shared secret transmission submodule 474 may transmit the KEM shared secret 470, for example, to another cryptography module 400, or to another component of the computing entity within which the cryptography module 400 is executing.

E. Example Combination Modules.

Figure 4E:
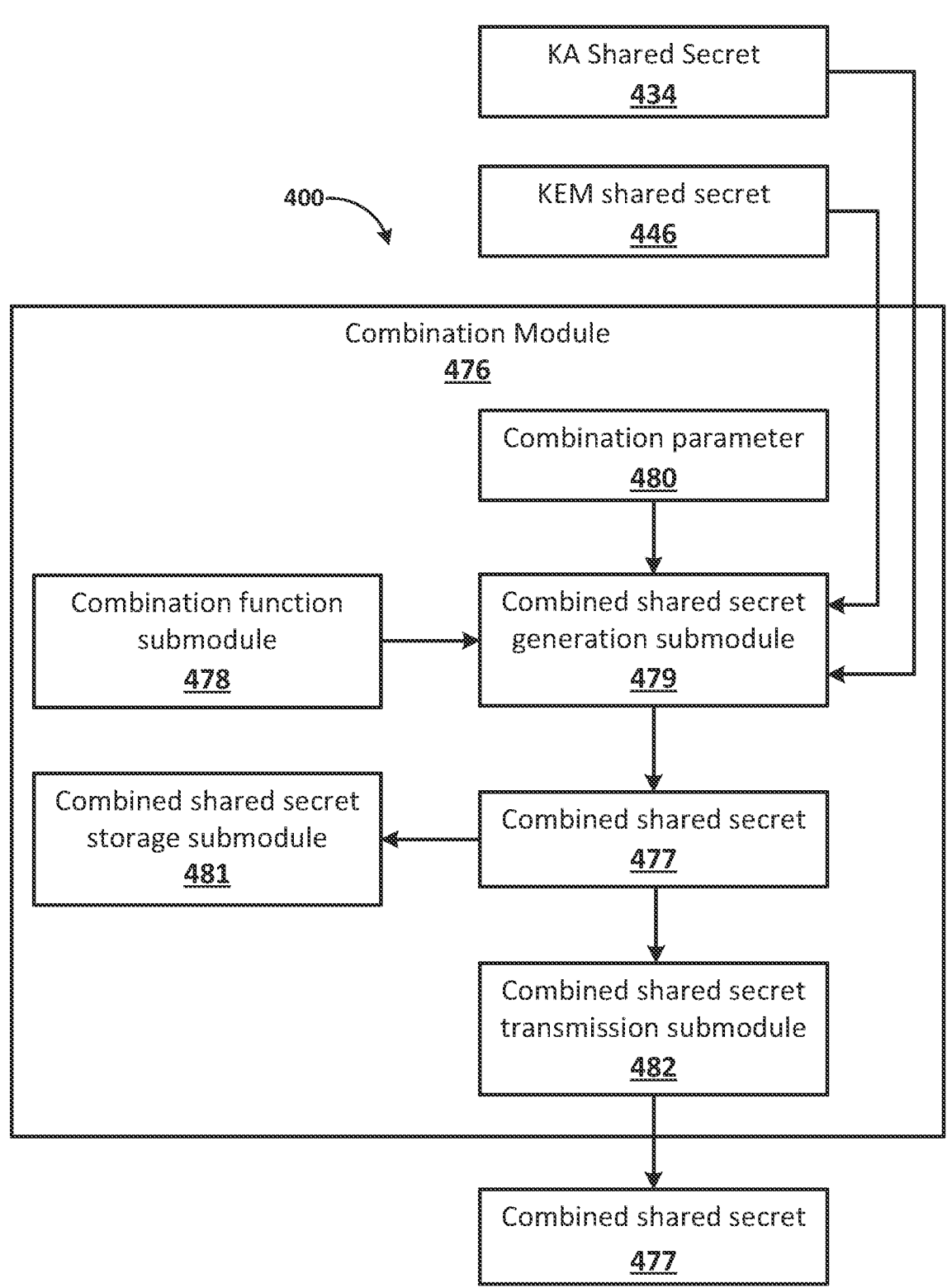

As shown in FIG. 4E, a cryptography module 400 may include a combination module 476. A combination module 476 may generate combined shared secrets 477 from one or more shared secrets, such as from a KA shared secret 434 and a KEM shared secret 446. A combined shared secret 477 that is generated from a KA shared secret 434 and a KEM shared secret 446 may be referred to as a KA-KEM combined shared secret. A combined shared secret may be utilized as an encryption key, or an encryption key may be generated that includes, or that is based on, the combined shared secret.

The combination module 476 may include a combination function submodule 478 and a combined shared secret generation submodule 479. The combination function submodule 478 may provide a cryptographic algorithm to the combined shared secret generation submodule 479 for generating a combined shared secret 477. In one example, a cryptographic algorithm for generating a combined shared secret 477 may be stored in the combination function submodule 478. Additionally, or in the alternative, the combination function submodule 478 may select a cryptographic algorithm for generating a combined shared secret 477 from a set of cryptographic algorithms. The cryptographic algorithm may be a quantum-resistant cryptographic algorithm or a legacy cryptographic algorithm. The combined shared secret generation submodule 479 may generate a combined shared secret 477 from a plurality of shared secrets and a combination parameter 480. For example, the combined shared secret 477 may be generated from a KA shared secret 434, a KEM shared secret 446, and a combination parameter 480, using the cryptographic algorithm provided by the combination function submodule 478.

The KA shared secret 434 utilized by the combined shared secret generation submodule 479 may be provided by the KA shared secret module 420 (FIG. 4B). In one example, the KA shared secret transmission submodule 438 (FIG. 4B) may transmit the KA shared secret to the combination module 476, such as to the combined shared secret generation submodule 479. The KEM shared secret 446 utilized by the combined shared secret generation submodule 479 may be provided by the KEM module 440 (FIG. 4C). In one example, the KEM shared secret transmission submodule 450 (FIG. 4C) may transmit the KEM shared secret 446 to the combination module 476, such as to the combined shared secret generation submodule 479.

The combination module 476 may further include a combined shared secret storage submodule 481 and/or a combined shared secret transmission submodule 482. The combined shared secret storage submodule 481 may store the combined shared secret 477 for future reference, for example, by one or more cryptography modules 400. The combined shared secret transmission submodule 482 may transmit the combined shared secret 477, for example, to another cryptography module 400, or to another component of the computing entity within which the cryptography module 400 is executing.

F. Example Message Encryption Modules.

Figure 4F:
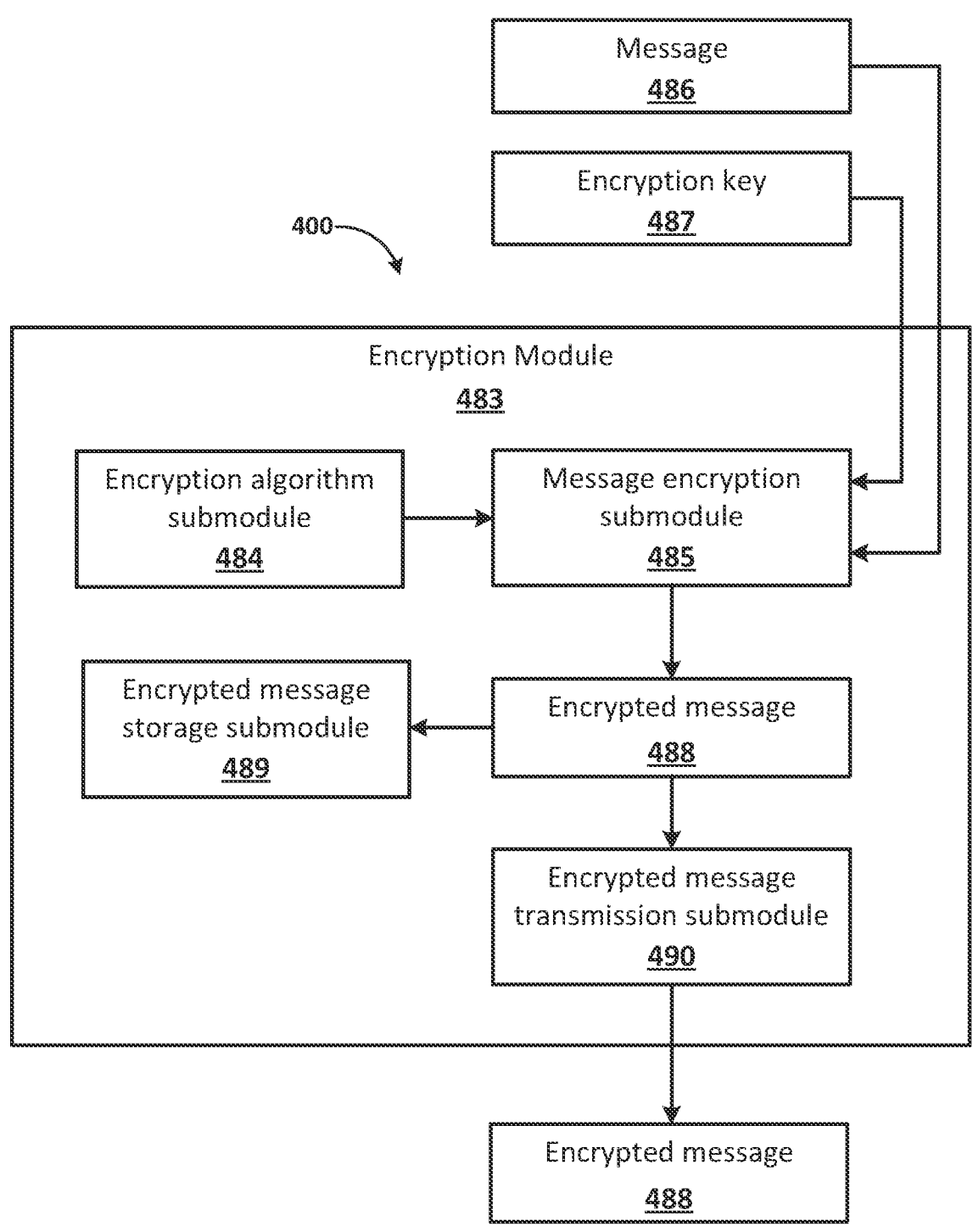

As shown in FIG. 4F, a cryptography module 400 may include an encryption module 483. An encryption module 483 may encrypt a message 486, for example, prior to transmitting the message to another computing entity. An encryption module 483 may generate encrypted messages 488 from an encryption key 487. In one example, one or more shared secrets may be utilized as an encryption key 487. Additionally, or in the alternative, an encryption key 487 may include, or may be generated based on, one or more shared secrets. In one example, a combined shared secret 477 may be utilized as an encryption key 487. Additionally, or in the alternative, an encryption key 487 may include, or may be generated based on, a combined shared secret 477.

The encryption module 483 may include an encryption algorithm submodule 484 and a message encryption submodule 485. The encryption algorithm submodule 484 may provide a cryptographic algorithm to the message encryption submodule 485 for generating an encrypted message 488. In one example, a cryptographic algorithm for generating an encrypted message 488 may be stored in the encryption algorithm submodule 484. Additionally, or in the alternative, the encryption algorithm submodule 484 may select a cryptographic algorithm for generating an encrypted message 488 from a set of cryptographic algorithms. The cryptographic algorithm may be a quantum-resistant cryptographic algorithm or a legacy cryptographic algorithm. The message encryption submodule 485 may generate an encrypted message 488 by encrypting a message 486 with an encryption key 487. In one example, the encryption key 487 may be a combined shared secret 477 provided by the combination module 476 (FIG. 4E). In one example, the combined shared secret transmission submodule 482 (FIG. 4E) may transmit the combined shared secret to the encryption module 483, such as to the message encryption submodule 485. Additionally, or in the alternative, the encryption key 487 may be a KA shared secret 434 provided, for example, from the KA shared secret transmission submodule 438 (FIG. 4B) or a KEM shared secret 446 provided, for example, from the KEM shared secret transmission submodule 450 (FIG. 4C).

The encryption module 483 may further include an encrypted message storage submodule 489 and/or an encrypted message transmission submodule 490. The encrypted message storage submodule 489 may store the encrypted message 488 for future reference, for example, by one or more cryptography modules 400. The encrypted message transmission submodule 490 may transmit the encrypted message 488, for example, to another cryptography module 400, or to another component of the computing entity within which the cryptography module 400 is executing. An encrypted message generated by the cryptography module 400 may be transmitted to another computing entity, where the other computing entity may decrypt the encrypted message.

G. Example Message Decryption Modules.

Figure 4G:
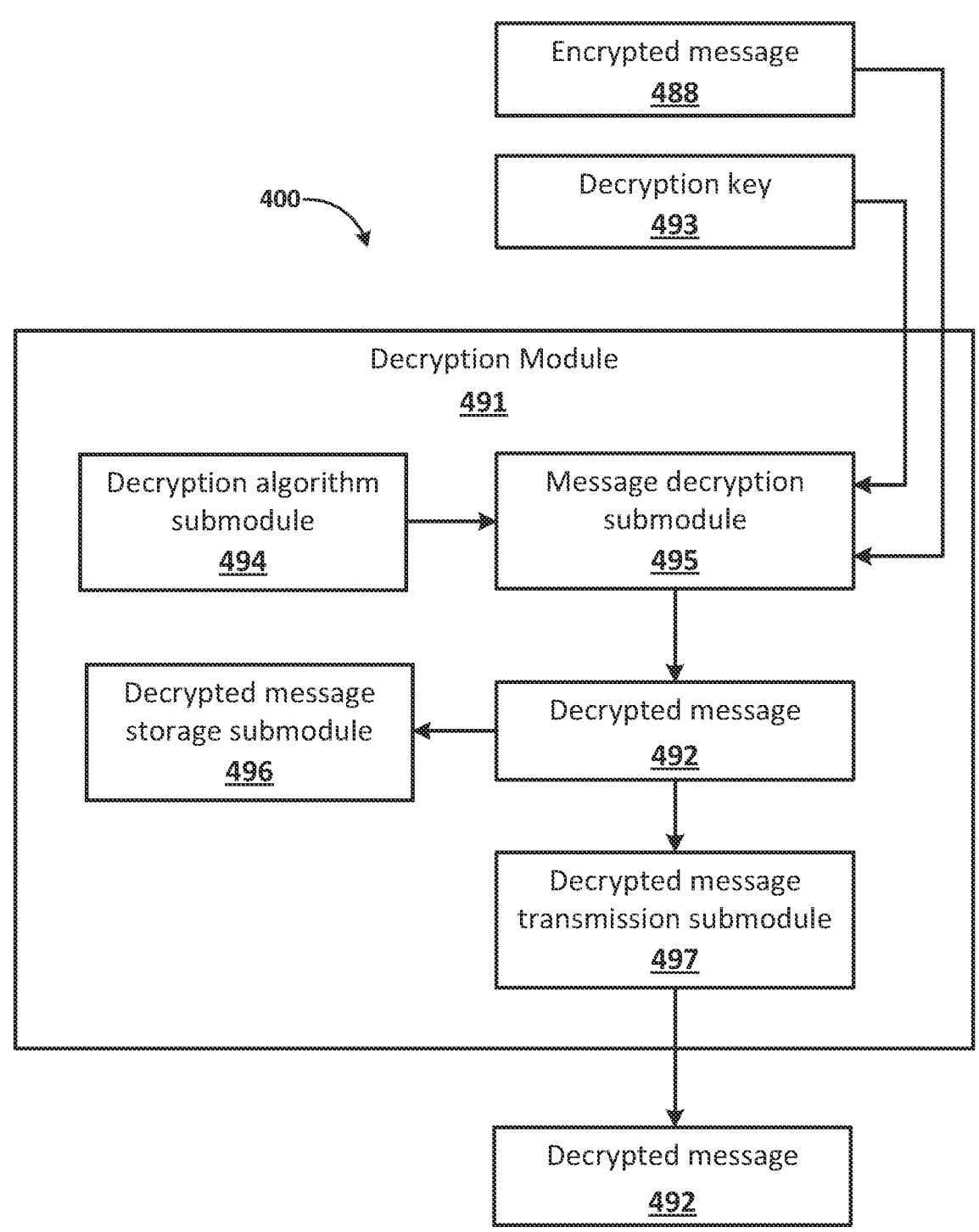

As shown in FIG. 4G, a cryptography module 400 may include a decryption module 491. A decryption module 491 may decrypt an encrypted message 488. The encrypted message 488 may be transmitted to the computing device executing the SE application from another computing device. A decryption module 491 may generate decrypted messages 492 by decrypting encrypted messages 488 with a decryption key 493 corresponding to the encryption key 487 (FIG. 4F) utilized to generate the encrypted messages 488. In one example, one or more shared secrets may be utilized as a decryption key 493. Additionally, or in the alternative, a decryption key 493 may include, or may be generated based on, one or more shared secrets. In one example, a combined shared secret 477 may be utilized as a decryption key 493. Additionally, or in the alternative, a decryption key 493 may include, or may be generated based on, a combined shared secret 477.

The decryption module 491 may include a decryption algorithm submodule 494 and a message decryption submodule 495. The decryption algorithm submodule 494 may provide a cryptographic algorithm to the message decryption submodule 495 for decrypting an encrypted message 488 to obtain a decrypted message 492. In one example, a cryptographic algorithm for decrypting an encrypted message 488 may be stored in the decryption algorithm submodule 494. Additionally, or in the alternative, the decryption algorithm submodule 494 may select a cryptographic algorithm for decrypting an encrypted message 488 from a set of cryptographic algorithms. The cryptographic algorithm may be a quantum-resistant cryptographic algorithm or a legacy cryptographic algorithm. The message decryption submodule 495 may obtain a decrypted message 492 by decrypting an encrypted message 488 with a decryption key 493. In one example, the decryption key 493 may be a combined shared secret 477 provided by the combination module 476 (FIG. 4E). In one example, the combined shared secret transmission submodule 482 (FIG. 4E) may transmit the combined shared secret to the decryption module 491, such as to the message decryption submodule 495. Additionally, or in the alternative, the decryption key 493 may be a KA shared secret 434 provided, for example, from the KA shared secret transmission submodule 438 (FIG. 4B) or a KEM shared secret 446 provided, for example, from the KEM shared secret transmission submodule 450 (FIG. 4C).

The decryption module 491 may further include a decrypted message storage submodule 496 and/or a decrypted message transmission submodule 497. The decrypted message storage submodule 496 may store the decrypted message 492 for future reference, for example, by one or more cryptography modules 400. The decrypted message transmission submodule 497 may transmit the decrypted message 492, for example, to another cryptography module 400, or to another component of the computing entity within which the cryptography module 400 is executing. A decrypted message obtained by the cryptography module 400 may be utilized by another component of the computing entity.

6. Example Message Encryption Operations

Figure 5:
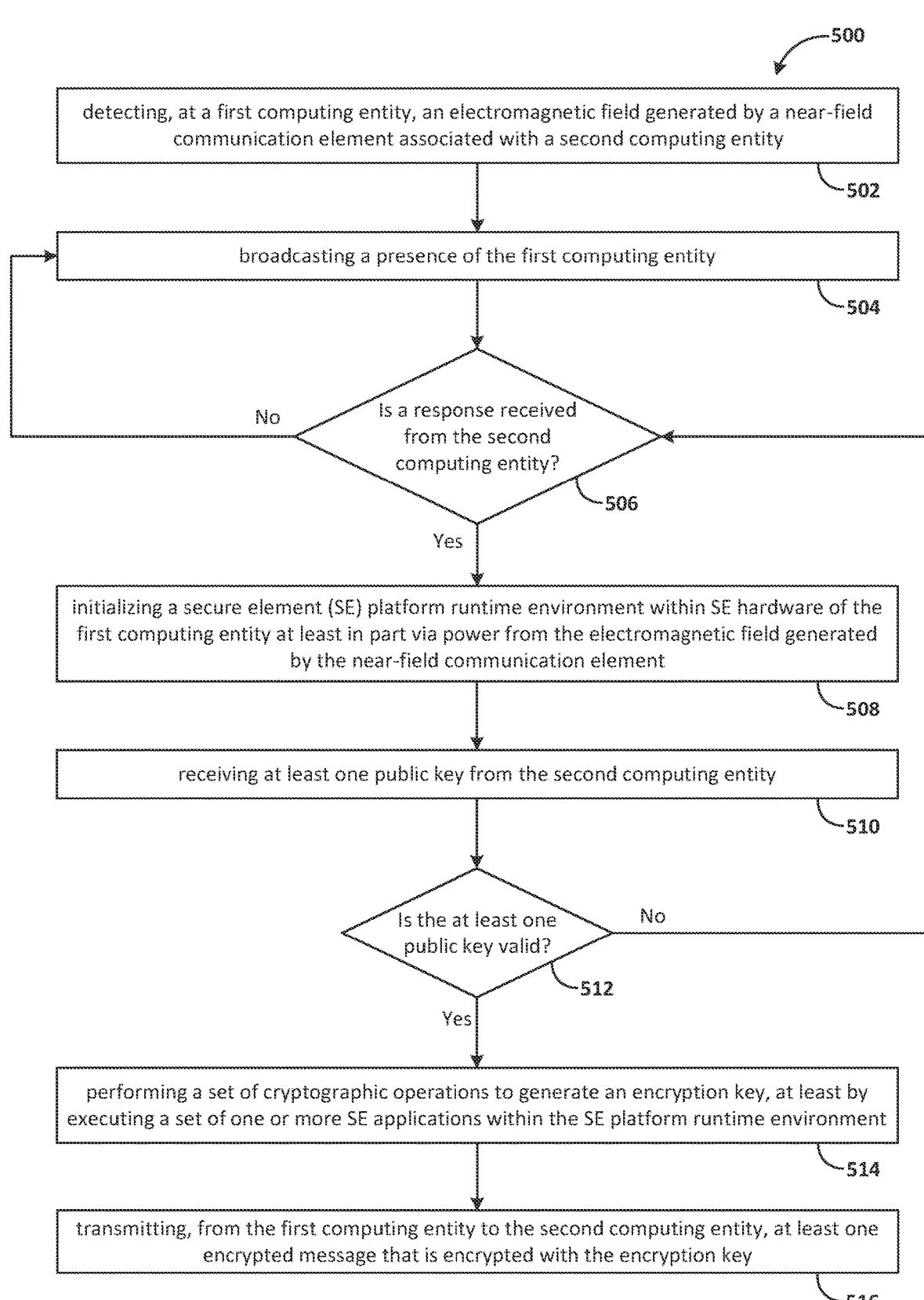
FIG. 5 is a flowchart that illustrates example operations pertaining to encrypted communications between computing entities in accordance with one or more embodiments.

Referring now to FIG. 5, example operations 500 pertaining to encrypting messages are described. The operations 500 described with reference to FIG. 5 may be executed with one or more components of the system 100 described with reference to FIG. 1 and/or with one or more components of the computing entity 200 described with reference to FIGS. 2A-2C. For example, the operations 500 may be executed at least in part in an SE platform runtime environment, such as in one or more LSEs of the SE platform runtime environment. One or more operations 500 described with reference to FIG. 5 may be modified, rearranged, or omitted all together. Accordingly, the particular sequence of operations described with reference to FIG. 5 should not be construed as limiting the scope of one or more embodiments. In one example, the operations 500 described with reference to FIG. 5 may be performed with respect to computing entity A (CE-A) 302 and computing entity B (CE-B) 304, as respectively described with reference to FIGS. 3A-3D.

As shown in FIG. 5, the operations 500 may include, at block 502, detecting, at a first computing entity, an electromagnetic field generated by a near-field communication element associated with a second computing entity. At block 504, the operations 500 may include broadcasting a presence of the first computing entity. At block 506, the operations 500 may include determining whether a response received from the second computing entity. When a response is received, the operations 500 may proceed to block 508. When a response is not received, the operations may return to block 504, where the presence of the first computing entity may continue being broadcast.

At block 508, the operations 500 may include initializing an SE platform runtime environment within SE hardware of the first computing entity at least in part via power from the electromagnetic field generated by the near-field communication element. At block 510, the operations 500 may include receiving at least one public key from the second computing entity. At block 512, the operations 500 may include determining whether the at least one public key is valid. When the at least on public key is valid, the operations 500 may proceed to block 513. If one of the at least one public keys is invalid, the operations may return to block 506.

At block 514, the operations 500 may include performing a set of cryptographic operations to generate an encryption key. The cryptographic operations may be performed at least by executing a set of one or more SE applications within the SE platform runtime environment. At block 516, the operations 500 may include transmitting, from the first computing entity to the second computing entity, at least one encrypted message that is encrypted with the encryption key. The cryptographic operations performed at block 514 may include one or more of the cryptographic operations described herein. In one example, the cryptographic operations may include one or more KA cryptographic operations, one or more KEM cryptographic operations, and/or one or more hybrid cryptographic operations.

7. Example Operations for Generating Encryption Keys

Figure 6B:
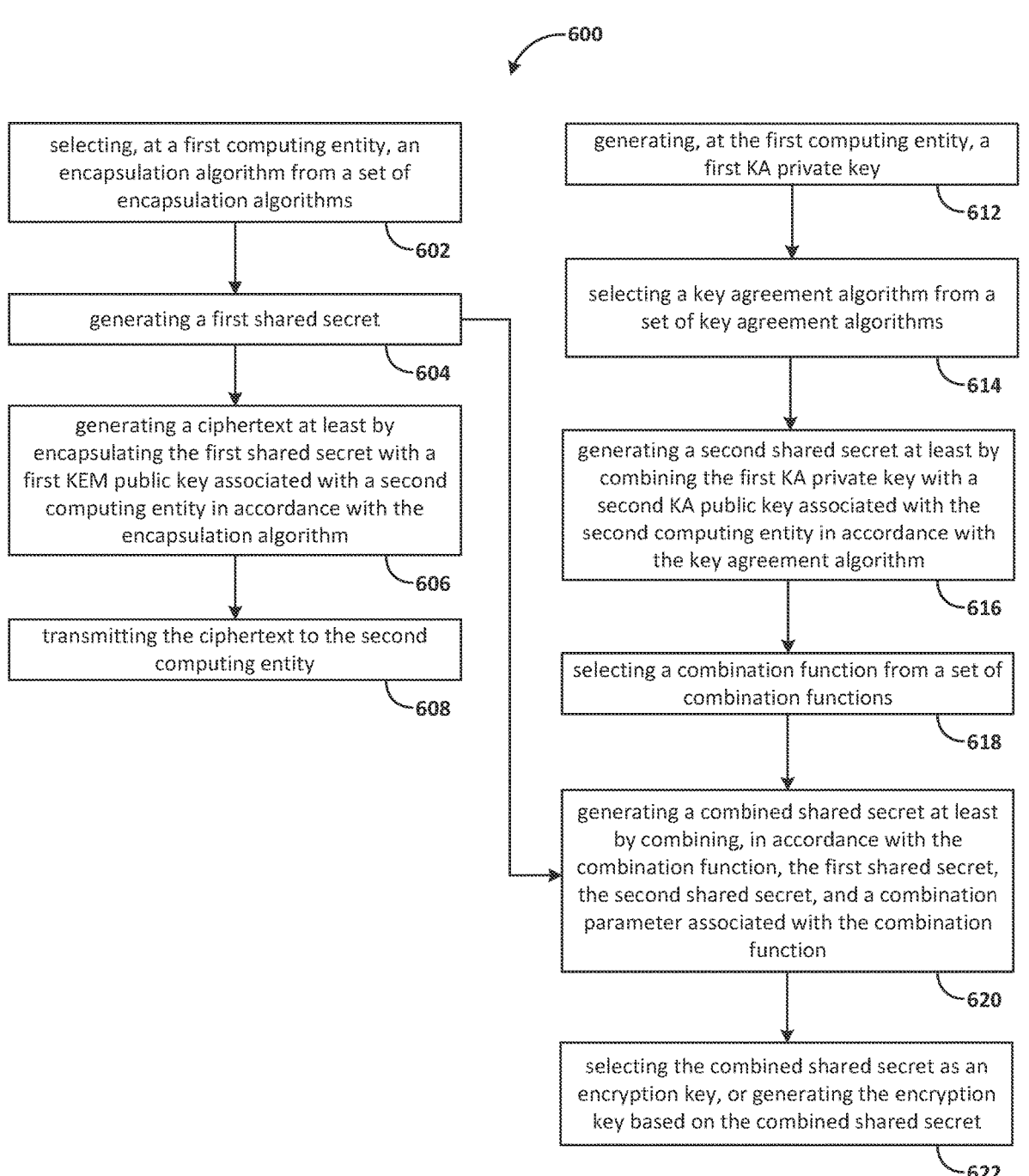

Referring now to FIGS. 6A and 6B, example operations 600 pertaining to generating encryption keys are described. The operations 600 described with reference to FIGS. 6A and 6B may be executed with one or more components of the system 100 described with reference to FIG. 1 and/or with one or more components of the computing entity 200 described with reference to FIGS. 2A-2C. For example, the operations 600 may be executed in an SE platform runtime environment, such as in one or more LSEs of the SE platform runtime environment. One or more operations 600 described with reference to FIGS. 6A and 6B may be modified, rearranged, or omitted all together. Accordingly, the particular sequence of operations described with reference to FIGS. 6A and 6B should not be construed as limiting the scope of one or more embodiments. In one example, the operations 600 described with reference to FIGS. 6A and 6B may be performed with respect to computing entity A (CE-A) 302 and computing entity B (CE-B) 304, as respectively described with reference to FIGS. 3A-3D. Additionally, described respectively generating an encryption key, as described with reference to block 514 of FIG. 5, may include one or more of the operations 600 described with reference to FIGS. 6A and 6B.

As shown in FIG. 6A, the operations 600 may include, at block 602, selecting, at a first computing entity, an encapsulation algorithm from a set of encapsulation algorithms. At block 604, the operations 600 may include generating a first shared secret. At block 606, the operations 600 may include generating a ciphertext at least by encapsulating the first shared secret with a first KEM public key associated with a second computing entity in accordance with the encapsulation algorithm. At block 608, the operations 600 may include transmitting the ciphertext to the second computing entity. At block 610, the operations 600 may include selecting the first shared secret as an encryption key, or generating the encryption key based on the first shared secret. The ciphertext transmitted to the second computing entity at block 608 may be utilized by the second computing entity to obtain the first shared secret by decrypting the ciphertext. The second computing entity may then utilize the first shared secret to generate the encryption key. The first computing entity and the second computing entity may exchange encrypted messages that are encrypted and decrypted with the shared secret as the encryption key or with the encryption key generated based on the shared secret.

As shown in FIG. 6B, the operations 600 may include generating a combined shared secret from a first shared secret and a second shared secret. The combined shared secret may be generated from the first shared secret and the second shared secret in a single operation, or the generation of the first shared secret, the second shared secret, and the combined shared secret may represent separate operations. The first shared secret may be generated from the operations 600 of blocks 602-608 described with reference to FIG. 6A. Additionally, the operations 600 may include, at block 612, generating, at the first computing entity, a first KA private key. At block 614, the operations 600 may include selecting a KA algorithm from a set of KA algorithms.

At block 616, the operations 600 may include generating a second shared secret at least by combining the first KA private key with a second KA public key associated with the second computing entity in accordance with the KA algorithm. At block 618, the operations 600 may include selecting a combination function from a set of combination functions. At block 620, the operations 600 may include generating a combined shared secret at least by combining, in accordance with the combination function, the first shared secret, the second shared secret, and a combination parameter associated with the combination function. At block 622, the operations 600 may include selecting the combined shared secret as an encryption key, or generating the encryption key based on the combined shared secret.

The second computing entity may similarly generate the combined shared secret as described with reference to blocks 612-622. The first computing entity and the second computing entity may exchange encrypted messages that are encrypted and decrypted with combined shared secret as the encryption key or with the encryption key generated based on the combined shared secret.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
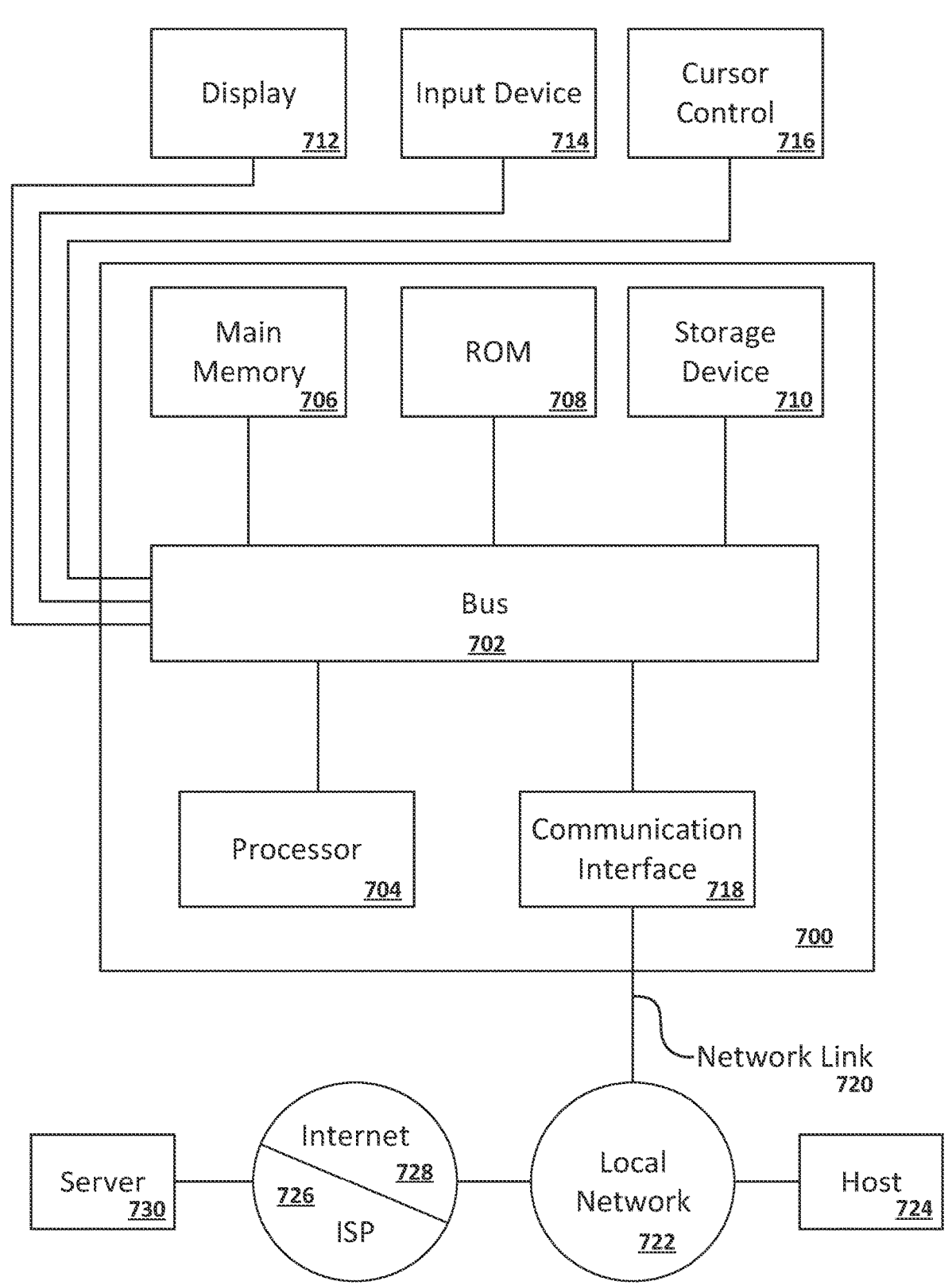
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 may include a bus 702 or other communication mechanism for communicating information, and a hardware processor 704 coupled with bus 702 for processing information. Hardware processor 704 may be, for example, a general-purpose microprocessor.

Computer system 700 also may include a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 may further include a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media may include, for example, optical or magnetic disks, such as storage device 710. Volatile media may include dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media may include coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also may include a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

11. Miscellaneous; Extensions

Embodiments are directed to a system with one or more devices that include a hardware processor and that are configured to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

In one or more embodiments, the systems described herein may include more or fewer components than the components described. The components described may be local to or remote from each other. The components described may be implemented in software and/or hardware. Each component may be distributed over multiple applications and/or machines. Multiple components may be combined into one application and/or machine. Operations described with respect to one component may instead be performed by another component.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:

executing a secure element (SE) platform runtime environment on at least one SE hardware processor comprised in a first computing entity, wherein the SE platform runtime environment comprises instructions, which when executed by the at least one SE hardware processor, cause performance of operations, comprising:

receiving a request from a device host hardware element of the first computing entity via a SE interface for transferring messages from the device host hardware element to the at least one SE hardware processor;

responsive at least in part to the request, performing a set of cryptographic operations at least by executing a set of SE applications within the SE platform runtime environment, wherein the set of SE applications are isolated, within the SE platform runtime environment, from the device host hardware element, wherein the set of cryptographic operations comprises:

executing a first SE application, of the set of SE applications, wherein executing the first SE application comprises:

generating, by the first SE application, a first shared secret;

generating, by the first SE application, a ciphertext at least by encapsulating the first shared secret with a first key encapsulation mechanism (KEM) public key associated with a second computing entity in accordance with an encapsulation algorithm;

executing a second SE application, of the set of SE applications, wherein executing the second SE application comprises:

obtaining, by the second SE application, the first shared secret from the first SE application for securely accessing data from the first SE application, and generating, by the second SE application, an encryption key based at least in part on the first shared secret, wherein the second SE application is different from the first SE application;

directing, from the at least one SE hardware processor to the device host hardware element via the SE interface, a response to the request, the response comprising the ciphertext; and transmitting the ciphertext from the first computing entity to the second computing entity, wherein subsequent to transmitting the ciphertext to the second computing entity:

the second computing entity (a) derives the first shared secret by decapsulating the ciphertext with a KEM private key corresponding to the first KEM public key and (b) generates a decryption key based at least in part on the first shared secret, and the first computing entity and the second computing entity exchange at least one encrypted message, wherein the first computing entity encrypts the at least one encrypted message with the encryption key and wherein the second computing entity decrypts the at least one encrypted message with the decryption key.

2. The method of claim 1, wherein the encapsulation algorithm comprises at least one of: a legacy cryptographic algorithm, or a quantum-resistant cryptographic algorithm.

3. The method of claim 1, wherein the set of SE applications comprises a key encapsulation mechanism module; and wherein executing the set of SE applications within the SE platform runtime environment comprises:

encapsulating the first shared secret with the first KEM public key in accordance with the encapsulation algorithm at least by executing the key encapsulation mechanism module, wherein an output of the key encapsulation mechanism module comprises the ciphertext.

4. The method of claim 1, wherein the set of cryptographic operations further comprise:

generating a first key agreement (KA) private key;

generating a second shared secret at least by combining the first KA private key with a first KA public key associated with the second computing entity in accordance with a KA algorithm;

generating a combined shared secret at least by combining, in accordance with a combination function, the first shared secret, the second shared secret, and a combination parameter associated with the combination function;

wherein the second computing entity derives the second shared secret at least by:

generating a second KA private key, and combining the second KA private key with a second KA public key associated with the first computing entity in accordance with the KA algorithm;

wherein the second computing entity derives the combined shared secret at least by combining, in accordance with the combination function, the first shared secret, the second shared secret, and the combination parameter associated with the combination function;

wherein the encryption key comprises, or is based at least in part on, the combined shared secret.

5. The method of claim 4, wherein the operations further comprise:

selecting the combination function from a set of combination functions.

6. The method of claim 4, wherein the operations further comprise:

receiving the first KEM public key and the first KA public key from the second computing entity;

validating the first KEM public key and the first KA public key;

responsive to validating the first KEM public key and the first KA public key, performing the set of cryptographic operations; and transmitting a first encrypted message to the second computing entity, wherein the first encrypted message is encrypted with the encryption key.

7. The method of claim 1, further comprising:

initializing the SE platform runtime environment at least in part via an electromagnetic field generated by a near-field communication element associated with the second computing entity; and receiving the first KEM public key from the second computing entity subsequent to initializing the SE platform runtime environment.

8. The method of claim 1, wherein the first computing entity and the second computing entity are communicatively coupled via a wired or wireless network.

9. The method of claim 1, wherein the operations further comprise:

initiating a cryptography module within the SE platform runtime environment; and selecting, via the cryptography module, the set of SE applications for execution within the SE platform runtime environment.

10. The method of claim 1, wherein the operations further comprise:

selecting the encapsulation algorithm from a set of encapsulation algorithms using an application programming interface.

11. The method of claim 1, wherein an application programming interface is utilized to perform at least one of: generating, configuring, or selecting, the set of SE applications.

12. The method of claim 1, wherein the operations further comprise:

configuring one or more parameters associated with the set of cryptographic operations based on one or more user inputs, wherein the one or more parameters comprises at least one of: the first KEM public key, or a selection of the encapsulation algorithm, wherein at least one of the one or more parameters is provided as a byte array.

13. One or more non-transitory computer-readable media comprising instructions, which when executed by one or more hardware processors associated with a first computing entity, cause performance of operations comprising:

initiating a cryptography module within a secure element (SE) platform runtime environment, wherein the one or more hardware processors comprise at least one SE hardware processor, and wherein the SE platform runtime environment is executed on the at least one SE hardware processor;

receiving a request from a device host hardware element of the first computing entity via a SE interface for transferring messages from the device host hardware element to the at least one SE hardware processor;

responsive at least in part to the request, performing a set of cryptographic operations at least by executing a set of SE applications within the SE platform runtime environment, wherein the set of SE applications are isolated, within the SE platform runtime environment, from the device host hardware element, wherein the set of cryptographic operations comprises:

executing a first SE application, of the set of SE applications, wherein executing the first SE application comprises:

generating, by the first SE application, a first shared secret;

generating, by the first SE application, a ciphertext at least by encapsulating the first shared secret with a first key encapsulation mechanism (KEM) public key associated with a second computing entity in accordance with an encapsulation algorithm;

executing a second SE application, of the set of SE applications, wherein executing the second SE application comprises:

obtaining, by the second SE application, the first shared secret from the first SE application for securely accessing data from the first SE application, and generating, by the second SE application, an encryption key based at least in part on the first shared secret, wherein the second SE application is different from the first SE application;

directing, from the at least one SE hardware processor to the device host hardware element via the SE interface, a response to the request, the response comprising the ciphertext; and transmitting the ciphertext from the first computing entity to the second computing entity, wherein subsequent to transmitting the ciphertext to the second computing entity:

the second computing entity (a) derives the first shared secret by decapsulating the ciphertext with a KEM private key corresponding to the first KEM public key and (b) generates a decryption key based at least in part on the first shared secret, and the first computing entity and the second computing entity exchange at least one encrypted message, wherein the first computing entity encrypts the at least one encrypted message with the encryption key and wherein the second computing entity decrypts the at least one encrypted message with the decryption key.

14. The one or more non-transitory computer-readable media of claim 13, wherein the set of SE applications comprises a key encapsulation mechanism module; and wherein executing the set of SE applications within the SE platform runtime environment comprises:

encapsulating the first shared secret with the first KEM public key in accordance with the encapsulation algorithm at least by executing the key encapsulation mechanism module, wherein an output of the key encapsulation mechanism module comprises the ciphertext.

15. The one or more non-transitory computer-readable media of claim 13, wherein the set of cryptographic operations further comprise:

generating a first key agreement (KA) private key;

generating a second shared secret at least by combining the first KA private key with a first KA public key associated with the second computing entity in accordance with a KA algorithm;

generating a combined shared secret at least by combining, in accordance with a combination function, the first shared secret, the second shared secret, and a combination parameter associated with the combination function;

wherein the second computing entity derives the second shared secret at least by:

generating a second KA private key, and combining the second KA private key with a second KA public key associated with the first computing entity in accordance with the KA algorithm;

wherein the second computing entity derives the combined shared secret at least by combining, in accordance with the combination function, the first shared secret, the second shared secret, and the combination parameter associated with the combination function;

wherein the encryption key comprises, or is based at least in part on, the combined shared secret.

16. The one or more non-transitory computer-readable media of claim 15, wherein the operations further comprise:

receiving the first KEM public key and the first KA public key from the second computing entity;

validating the first KEM public key and the first KA public key;

responsive to validating the first KEM public key and the first KA public key, performing the set of cryptographic operations; and transmitting a first encrypted message to the second computing entity, wherein the first encrypted message is encrypted with the encryption key.

17. The one or more non-transitory computer-readable media of claim 13, wherein the operations further comprise:

initializing the SE platform runtime environment at least in part via an electromagnetic field generated by a near-field communication element associated with the second computing entity; and receiving the first KEM public key from the second computing entity subsequent to initializing the SE platform runtime environment.

18. The one or more non-transitory computer-readable media of claim 13, wherein the operations further comprise:

initiating a cryptography module within the SE platform runtime environment; and selecting, via the cryptography module, the set of SE applications for execution within the SE platform runtime environment.

19. The one or more non-transitory computer-readable media of claim 13, wherein the operations further comprise:

configuring one or more parameters associated with the set of cryptographic operations based on one or more user inputs, wherein the one or more parameters comprises at least one of: the first KEM public key, or a selection of the encapsulation algorithm, wherein at least one of the one or more parameters is provided as a byte array.

20. A system, comprising:

at least one secure element (SE) hardware processor associated with a first computing entity;

an SE platform runtime environment executable on the at least one SE hardware processor;

wherein the SE platform runtime environment is configured to execute operations, using the at least one SE hardware processor, the operations comprising:

receiving a request from a device host hardware element of the first computing entity via a SE interface for transferring messages from the device host hardware element to the at least one SE hardware processor;

responsive at least in part to the request, performing a set of cryptographic operations at least by executing a set of SE applications within the SE platform runtime environment, wherein the set of SE applications are isolated, within the SE platform runtime environment, from the device host hardware element, wherein the set of cryptographic operations comprises: executing a first SE application, of the set of SE applications, wherein executing the first SE application comprises:

generating, by the first SE application, a first shared secret;

generating, by the first SE application, a ciphertext at least by encapsulating the first shared secret with a first key encapsulation mechanism (KEM) public key associated with a second computing entity in accordance with an encapsulation algorithm;

executing a second SE application, of the set of SE applications, wherein executing the second SE application comprises:

obtaining, by the second SE application, the first shared secret from the first SE application for securely accessing data from the first SE application, and generating, by the second SE application, an encryption key based at least in part on the first shared secret, wherein the second SE application is different from the first SE application;

directing, from the at least one SE hardware processor to the device host hardware element via the SE interface, a response to the request, the response comprising the ciphertext; and transmitting the ciphertext from the first computing entity to the second computing entity, wherein subsequent to transmitting the ciphertext to the second computing entity:

the second computing entity (a) derives the first shared secret by decapsulating the ciphertext with a KEM private key corresponding to the first KEM public key and (b) generates a decryption key based at least in part on the first shared secret, and the first computing entity and the second computing entity exchange at least one encrypted message, wherein the first computing entity encrypts the at least one encrypted message with the encryption key and wherein the second computing entity decrypts the at least one encrypted message with the decryption key.

21. The system of claim 20, wherein obtaining the first shared secret from the first SE application comprises:

generating a shareable interface object, and utilizing the shareable interface object to obtain the first shared secret from the first SE application.

22. The system of claim 20, wherein executing the first SE application further comprises:

storing the first shared secret in a transient memory element, and generating a transient object handle comprising a reference to the first shared secret in the transient memory element;

wherein obtaining the first shared secret from the first SE application comprises:

utilizing the transient object handle to access the first shared secret from the transient memory.

\* \* \* \* \*